(12) United States Patent
Tsai et al.

(10) Patent No.: US 6,582,235 B1
(45) Date of Patent: Jun. 24, 2003

(54) METHOD AND APPARATUS FOR DISPLAYING MUSIC PIECE DATA SUCH AS LYRICS AND CHORD DATA

(75) Inventors: Tom Jen Tsai, Hamamatsu (JP); Masahiko Wakita, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 131 days.

(21) Appl. No.: 09/717,578

(22) Filed: Nov. 21, 2000

(30) Foreign Application Priority Data

Nov. 26, 1999 (JP) ............................................ 11-336464

(51) Int. Cl.⁷ ................................................. G09B 5/00
(52) U.S. Cl. ............................ 434/307 A; 434/307 R; 84/470 R
(58) Field of Search ........................... 434/350, 307 A, 434/307 R; 84/470 R

(56) References Cited

U.S. PATENT DOCUMENTS

| | | | |
|---|---|---|---|
| 5,048,390 A | | 9/1991 | Adachi |
| 5,247,126 A | * | 9/1993 | Okamura et al. ............. 360/49 |
| 5,723,803 A | | 3/1998 | Kurakake |
| 5,782,692 A | * | 7/1998 | Stelovsky ................ 434/307 A |
| 5,804,752 A | * | 9/1998 | Sone et al. .............. 369/53.31 |
| 6,018,121 A | * | 1/2000 | Devecka .................. 434/307 A |
| 6,053,740 A | | 4/2000 | Nakata |
| 6,062,867 A | | 5/2000 | Torimura |
| 6,188,008 B1 | * | 2/2001 | Fukata ...................... 84/470 R |
| 6,352,432 B1 | * | 3/2002 | Tsai et al. ............... 434/307 A |
| 6,369,311 B1 | * | 4/2002 | Iwamoto ................. 434/307 A |

* cited by examiner

*Primary Examiner*—Valencia Martin-Wallace
*Assistant Examiner*—John Sotomayor
(74) *Attorney, Agent, or Firm*—Morrison & Foerster LLP

(57) ABSTRACT

Display device displays a character string of lyrics and accompaniment information. Characters or unit words of the lyrics corresponding to a current performance position and a next performance position are displayed in different display styles, in accordance with progression of the performance. Pieces of the accompaniment information corresponding to the current performance position and the next performance position may be displayed in different display styles, in accordance with the progression of the performance. Thus, even when the characters or unit words of the lyrics corresponding to the current and next performance position are displayed in an overlapping condition, a user is allowed to readily distinguish between the overlapping characters or unit words.

35 Claims, 12 Drawing Sheets

TIMING SCREEN D ( OR C )
( KEYBOARD PART TONE DISPLAY FOR 4 MEASURES )
( 8 MEASURES FOR TIMING SCREEN C )

someonin love

FIG. 11A someonin love

FIG. 11B

METHOD AND APPARATUS FOR DISPLAYING MUSIC PIECE DATA SUCH AS LYRICS AND CHORD DATA

BACKGROUND OF THE INVENTION

The present invention relates generally to music-piece-data display controlling apparatus and methods for displaying lyrics and chord names in accordance with tones reproduced on the basis of a selected set of music piece data, and more particularly to an improved music-piece-data display controlling apparatus and method which display lyrics, chord names and instrument-performance assisting information in accordance with progression of tones in an easy-to-read manner.

In some of the conventionally-known automatic performance apparatus such as electronic musical instruments and karaoke apparatus, background pictures (images) and lyrics of a user-selected music piece are displayed sequentially on a predetermined display screen as an automatic performance (i.e., reproduction) of a music piece proceeds on the basis of the music piece data. From Japanese Patent Laid-open Publication No. HEI-6-308991, for example, there has also been known an automatic performance apparatus which, for a user who wants to play a musical instrument to an automatically-performed music piece, displays, on the screen, not only lyrics of a predetermined performance section of the music piece but also chord names corresponding to the lyrics. Generally, these known automatic performance apparatus employ a music-piece-data display controlling apparatus, by which individual characters of the lyrics and chord names—the terms "character" as used herein in connection with lyrics refers to a character in the case of a song in mono-syllable language such as Japanese, or a unit word or phonetic unit in the case of a song in poly-syllable language such as English unless specified otherwise—, not to mention the background pictures, are sequentially changed in color in accordance with the progression of the automatically-performed music piece so that the user can play a desired musical instrument, such as a guitar or piano, to the automatically-performed music piece by operating the musical instrument in accordance with the sequentially-changing display color of the characters.

However, the conventionally-known music-piece-data display controlling apparatus are designed to change the display color of only the lyrics character or unit word corresponding to a current performance position (i.e., a position being currently performed) of the music piece. Thus, in a case where the chord progression and lyrics are displayed together and if a predetermined character string of the lyrics to be displayed can not be appropriately fit within a corresponding measure range of the displayed chord progression, the character of the lyrics for the current performance position of the music piece would be displayed too close to or in an overlapping relation to the character of the lyrics for a next performance position of the music piece, which thus tends to result in a hard-to-read, inappropriate display. Similar problem would occur to the displayed characters of the chord names. Particularly, for a character of the lyrics to be sung with a long vowel, two or more chords are sometimes to be displayed in corresponding relation to such a character of the lyrics. If, in such a case, the two or more chords are displayed simply in correspondence with the character to be sung with a long vowel, the chord names would be displayed in an overlapping condition and tend to be very hard to read on the screen. Namely, with the conventional music-piece-data display controlling apparatus, the individual characters of the lyrics are shown on a video display one after another simply at fixed uniform intervals as defined by the character font, and so each character of the lyrics can be displayed only within a predetermined limited width on the screen, with the result that a plurality of chords are sometimes displayed in an overlapping relation to each other.

Further, because only the lyrics and corresponding chord names are displayed on the screen for the user desiring to play the musical instrument to the performed music piece, the user can not know, from the display screen, individual timing for playing the instrument and individual pitches to be performed on the instrument, and thus the display provided via the conventional music-piece-data display controlling apparatus tends to be inconvenient and unsatisfactory.

SUMMARY OF THE INVENTION

It is therefore an object of the present invention to provide an improved music-piece-data display controlling method and apparatus which displays lyrics or chord progression on a predetermined display screen in an easy-to-read fashion. It is another object of the present invention to provide a music-piece-data display controlling method and apparatus which allow a user to readily perform a musical instrument manually to progression of an automatic performance of a music piece by displaying individual performance timing for playing the musical instrument and tone pitches to be performed on the musical instrument in accordance with a performance progression of a music piece.

In order to accomplish the above-mentioned object, the present invention provides a music piece data display method which comprises the steps of: causing a display device to display a character string of lyrics for a predetermined performance section of a music piece in accordance with progression of a performance of the music piece; and controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles. The character string of lyrics is liable to be displayed on the display device with some adjoining characters or unit words of the lyrics overlapping each other at least partly, and thus, the controlling step performs control such that the overlapping characters or unit words of the lyrics are displayed in different display styles so as to be visually distinguished from each other.

According to the present invention, the display of the character string of lyrics on the display device is controlled, in accordance with the progression of the performance, in such a manner that a character or unit word of the lyrics corresponding to the current position in the progression of the performance and a character or unit word of the lyrics corresponding to the next position in the progression of the performance are displayed in different display styles. Thus, in a situation where the character string of lyrics is liable to be displayed on the display device with some adjoining characters or unit words of the lyrics overlapping each other at least partly, the overlapping characters or unit words of the lyrics are controlled to be displayed in different display styles for visual distinction from each other. Namely, even when the characters or unit words of the lyrics corresponding to the current and next performance positions are displayed in an overlapping condition, the inventive arrangement of displaying the characters or units word of the lyrics corresponding to current and next positions in different display styles in accordance with the performance progression allows a user to readily distinguish between the overlapping characters or unit words. Namely, even in a situation where adjoining lyrics characters are displayed in succession with a partial overlap, the different display styles of the overlapping adjoining lyrics characters allows the user to readily distinguish between the overlapping adjoining lyrics characters and thereby provides a visual display that is very easy for the user to read.

The present invention also provides a music piece data display method which comprises the steps of: causing a display device to display accompaniment information for a predetermined performance section of a music piece in accordance with progression of a performance of the music piece; and controlling, in accordance with the progression of the performance, display of the accompaniment information on the display device in such a manner that a piece of the accompaniment information corresponding to a current position in the progression of the performance and a piece of the accompaniment information corresponding to a next position in the progression of the performance are displayed in different display styles. This way, even when pieces of the accompaniment information corresponding to the current and next performance positions are displayed in an overlapping condition, i.e. even in a situation where adjoining pieces of the accompaniment information are displayed in succession with a partial overlap, the different display styles allows the user to readily distinguish between the overlapping adjoining pieces of the accompaniment information. Thus, even when characters representing the adjoining pieces of the accompaniment information are displayed in an overlapping condition, the different display styles allows the user to readily distinguish between the overlapping characters and thereby provides a visual display that is very easy for the user to read.

The present invention also provides a music piece data display method which comprises the steps of: causing a display device to display a character string of lyrics and accompaniment information for a predetermined performance section of a music piece in accordance with progression of a performance of the music piece; controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and controlling, in accordance with the progression of the performance, display of the accompaniment information on the display device in such a manner that a piece of the accompaniment information corresponding to the current position in the progression of the performance and a piece of the accompaniment information corresponding to the next position in the progression of the performance are displayed in different display styles.

By thus displaying, in the different display styles, the lyrics characters and pieces of the accompaniment information corresponding to the current and next positions when displaying the lyrics characters and accompaniment information in accordance with the performance progression, the user is allowed to distinguish between the displays corresponding to the current and next positions even when they are displayed with a partial overlap. Further, because the accompaniment information is displayed near the display of the lyrics with the display style varied in accordance with the performance progression, the user is allowed to readily enjoy performing the accompaniment while viewing the displayed lyrics.

The present invention also provides a music piece data display method which comprises the steps of: causing a display device to display a character string of lyrics for a predetermined performance section of a music piece in accordance with progression of a performance of the music piece; controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and displaying accompaniment information near the character string of lyrics displayed on the display device, in accordance with the progression of the performance.

The present invention provides a music piece data display method which comprises the steps of: causing a display device to display a character string of lyrics for a predetermined performance section of a music piece in accordance with progression of a performance of the music piece; and displaying chord information in accordance with the progression of the performance and in corresponding relation to the character string of lyrics displayed on the display device, the step of displaying chord information determining respective positions of pieces of the chord information, to be displayed in succession, such that displays of the pieces of the chord information do not overlap each other. Intervals between characters or unit words in the character string of lyrics, to be displayed on the display device by the step of causing, can be varied to become non-uniform, depending on the positions of the pieces of the chord information displayed by the step of displaying chord information. For example, in a situation where a plurality of pieces of chord information are to be displayed in succession between lyrics characters and they are likely to be displayed in an overlapping condition, the present invention displays the lyrics characters with the interval therebetween increased appropriately depending taking into account the positions of the pieces of the chord information. With the thus-increased interval between the lyrics characters, two or more pieces of the chord information, to be displayed in succession between the lyrics characters, can be displayed with no overlap therebetween.

The present invention further provides a music piece data display method which comprises the steps of: causing a display device to display a character string of lyrics for a predetermined performance section of a music piece in accordance with progression of a performance of the music piece; displaying accompaniment information near the character string of lyrics displayed on the display device, in accordance with the progression of the performance; and displaying information indicative of performance timing of the accompaniment information, in corresponding relation to display of the accompaniment information by the step of displaying accompaniment information. With this arrangement, the user or human player can make a performance operation corresponding to the accompaniment information (e.g., chord information) to the displayed performance timing and thereby can enjoy an accompaniment ensemble in accordance with the progression of the music piece performance.

The accompaniment information is typically in the form of chord information, in which case the detecting step detects performance timing of a predetermined performance part on the basis of performance data of the predetermined performance part other than chord data and the performance timing of the predetermined performance part detected by the step of detecting is displayed in corresponding relation to the accompaniment information. With this arrangement, the human player can perform a chord accompaniment without monotonousness and can even further enjoy an accompaniment ensemble in accordance with the progression of the music piece performance.

Further, the present invention provides a music piece data display method which comprises the steps of: displaying lyrics in accordance with progression of a performance of a music piece, and creating data of a display screen that displays, in corresponding relation to display of the lyrics, accompaniment information matching with the progression of the performance. In this case, a plurality of the display screens can be created which differ from each other at least in time-axial display scale. The music piece data display method further comprises a step of selecting one of the display screens and causing the display device to display the selected display screen. Because there can be created a plurality of the display screens of different time-axial display scales and any one of the display screens having an optimum display scale, the present invention can always provide a very efficient music piece data display.

The present invention also provides a music piece data display method which comprises the steps of: displaying, by chord names, a chord progression for a predetermined performance section of a music piece in accordance with progression of a performance of the music piece; and simultaneously displaying component tones of a chord corresponding to a current position in the chord progression and component tones of a chord corresponding to a next position in the chord progression in different display styles visually distinguishing therebetween. By the chord name display, a chord progression throughout the predetermined performance section (e.g., several measures) can be readily known. Also, because chord component tones to be performed at the current position and chord component tones to be performed at the next position are displayed in detail in separate distinguishable styles, the present invention can provide a user-friendly performance guide that is very easy even for a sheer beginner to read.

The present invention also provides a music piece data display method which comprises the steps of: identifying an available pitch range of a keyboard to be used for a performance of a music piece; and displaying component tones of a chord to be currently performed in accordance with a chord progression of the performance, the step of displaying being capable of displaying chord component tones in a turn-back fashion such that any chord component tones can be displayed within the available pitch range of the keyboard identified by the step of identifying. Even where the keyboard has an available pitch range of just one octave, any designated chord component tones beyond the keyboard pitch range are displayed in a turn-back fashion (with an octave shift) as appropriate. Thus, the present invention can provide a proper chord performance guide.

Further, the present invention provides a music piece data display method which comprises the steps of: causing a display device to display lyrics for a predetermined performance section of a music piece and chord names corresponding to a chord progression in the predetermined performance section, in accordance with progression of the performance; and making a display indicating, on a diagram simulating a keyboard, component tones of at least a chord corresponding to a current position in the chord progression. By the display of the lyrics and chord names, lyrics and chord progression throughout the predetermined performance section (e.g., several measures) can be readily known. Also, because at least chord component tones to be performed at the current position are displayed in detail in separate distinguishable styles, the present invention can provide a user-friendly performance guide that is very easy even for a sheer beginner to read and manipulate.

The present invention may be constructed and practiced not only as the method invention but also as a music-piece-data display controlling apparatus. The present invention may also be practiced as a program for execution by a processor such as a computer or DSP., as well as a recording medium storing such a program. The processor may be a dedicated processor having incorporated therein dedicated logic in hardware, not to mention a general-purpose processor such as a computer executing a desired software program.

BRIEF DESCRIPTION OF THE DRAWINGS

For better understanding of the object and other features of the present invention, its preferred embodiments will be described in greater detail hereinbelow with reference to the accompanying drawings, in which:

FIGS. 11A and 11B are diagrams explaining how changes are made in display colors of lyrics unit words or characters;

DETAILED DESCRIPTION OF THE PREFERRED EMBODIMENTS

Figure 1:
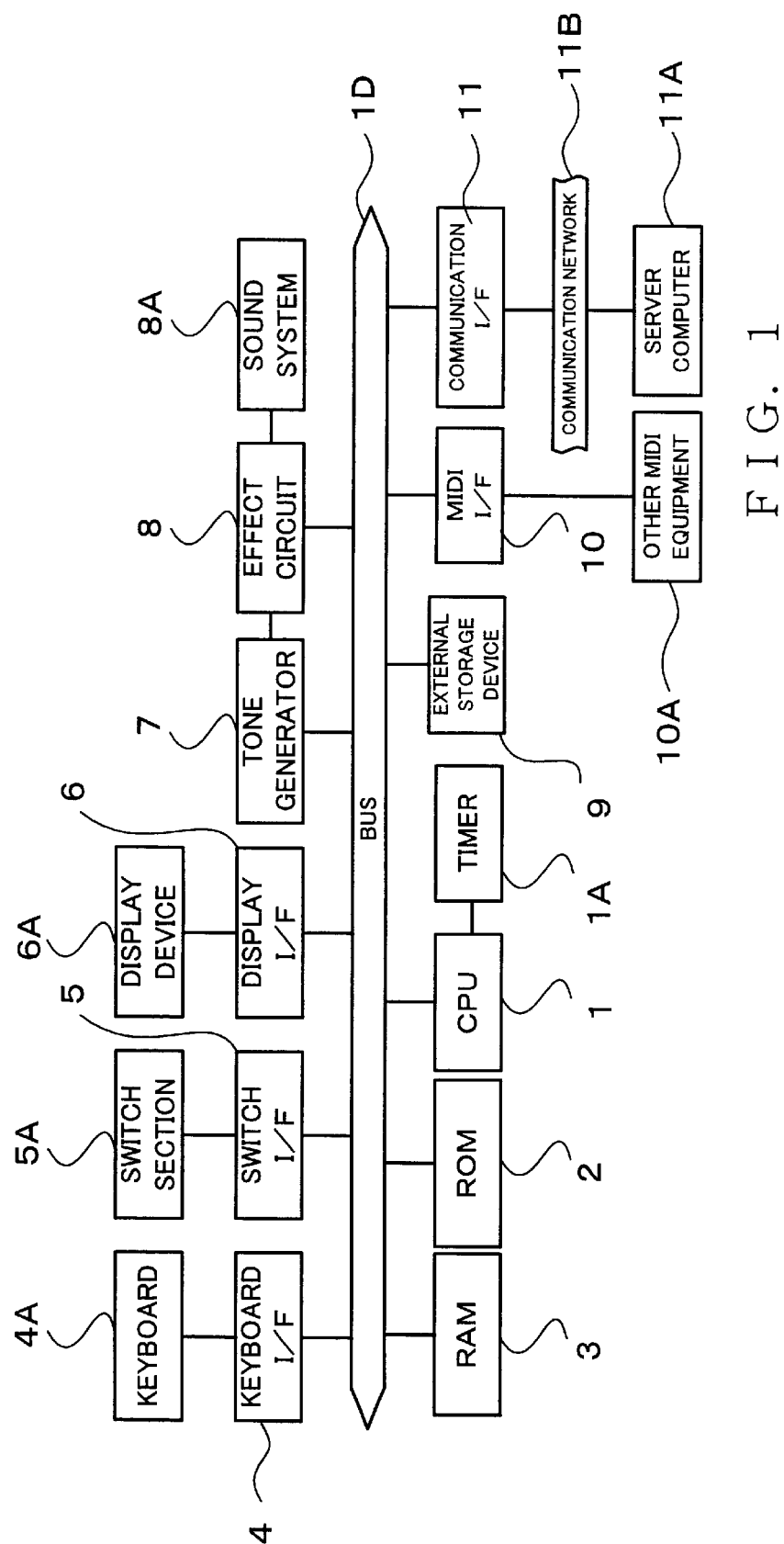
FIG. 1 is a block diagram showing an exemplary hardware setup of an electronic musical instrument which has incorporated therein an automatic performance apparatus and a music-piece-data display controlling apparatus in accordance with an embodiment of the present invention.

FIG. 1 is a block diagram illustrating a general hardware setup of an electronic musical instrument having incorporated therein a music-piece-data display controlling apparatus according to an embodiment of the present invention as well as an automatic performance apparatus.

This electronic musical instrument is controlled by a microcomputer comprising a microprocessor unit (CPU) 1, a read-only memory (ROM) 2 and a random access memory (RAM) 3. The instant embodiment of the present invention will hereinafter be described in relation to the electronic musical instrument where various processing pertaining to display of music piece data is carried out by the single CPU 1. To the CPU 1 are connected, via a data and address bus 1D, the read-only memory 2, random access memory 3, keyboard interface (I/F) 4, switch interface 5, display interface 6, tone generator (T.G.) circuit 7, effect circuit 8, external storage device 9, MIDI interface 10 and communication interface 11. The CPU 1 controls operation of the entire electronic musical instrument on the basis of various programs and data stored in the ROM 2 and RAM 3 and tone control information (e.g., music piece data) supplied from the external storage device 9. Also connected to the CPU 1 is a timer 1A for counting various time periods, for example, to signal interrupt timing for timer interrupt processes.

The ROM 2 has prestored therein various programs and various data for execution or reference by the CPU 1. The RAM is used as a working memory for temporarily storing various automatic-performance-related information and various data occurring as the CPU 1 executes the programs, or as a memory for storing a currently executed program and data pertaining to the program. Predetermined address regions of the RAM 3 are allocated to various functions fur use as registers, flags, tables, memories, etc. Keyboard 4A includes a plurality of keys for selecting a pitch of each tone to be generated and a plurality of key switches provided in corresponding relations to the keys. The keyboard 4A can be used not only for tone performance but also as means for a user to instruct selection of desired music piece data etc. The keyboard interface 4 detects each key depression and release to thereby output key-on event data and key-off event data. Switch section 5A includes various operators for the user to input a music-piece-data selecting instruction and various musical conditions pertaining to the music piece to be performed. For example, the switch section 5A may be in the form of a ten-button keypad for entry of numeric value data and a keyboard for entry of text data or switch panel, or a combination thereof. The switch section 5A may also include operators for selecting, setting and controlling a tone pitch, color, effect, etc. Examples of the operators on the switch section 5A may include screen-display-mode selecting switches such as a lyrics screen button, a timing screen button, a 4 measure/8 measure button, a chord component tone/keyboard button. The switch interface 5 constantly detects respective operational states of the individual operators on the switch section 5A and outputs switch information, corresponding to the detected operational states of the operators, to the CPU 1 via the data and address bus 1D. The display interface 6 is an interface for visually showing, on a display device 6A such as an LCD or CRT, various information, such as controlling conditions of the CPU 1, contents of the music piece data and information for assisting in a performance of a musical instrument (e.g., performance-assisting information to be displayed on the lyrics screen or timing screen).

The tone generator (T.G.) circuit 7, which is capable of simultaneously generating tone signals in a plurality of channels, receives performance information supplied via the data and address bus 1D and generates tone signals based on the received performance information. Each of the tone signals thus generated by the tone generator circuit 7 is audibly reproduced or sounded by a sound system 8A. The effect circuit 8 imparts various effects to the tone signals generated by the tone generator circuit 7. Any desired tone signal generation method may be used in the tone generator circuit 7, such as: the memory readout method where sound waveform sample value data stored in a waveform memory are sequentially read out in accordance with address data that vary in correspondence with the pitch of a tone to be generated; the FM method where sound waveform sample value data are obtained by performing predetermined frequency modulation operations using the above-mentioned address data as phase angle parameter data; or the AM method where sound waveform sample value data are obtained by performing predetermined amplitude modulation operations using the above-mentioned address data as phase angle parameter data. Other than the abovementioned, the tone generator circuit 7 may also use the physical model method, harmonics synthesis method, formant synthesis method, analog synthesizer method using VCO, VCF and VCA, or analog simulation method. Further, the tone generator circuit 7 may be implemented by a combined use of a DSP and microprograms or of a CPU and software programs, rather than by use of dedicated hardware. The tone generation channels to simultaneously generate a plurality of tone signals in the tone generator circuit 7 may be implemented either by using a single circuit on a time-divisional basis or by providing a separate circuit for each of the channels.

The external storage device 9 is provided for storing performance information, such as music piece data, and data relating to control of the various programs for execution by the CPU 1. Where a particular control program is not prestored in the ROM 2, the control program may be prestored in the external storage device (e.g., hard disk device) 9, so that, by reading the control program from the external storage device 9 into the RAM 3, the CPU 1 is allowed to operate in exactly the same way as in the case where the control program is stored in the program memory 2. This arrangement greatly facilitates version upgrade of the control program, addition of a new control program, etc. The external storage device 9 may use any of various removable-type media other than the hard disk (HD), such as a floppy disk (FD), compact disk (like CD-ROM or CD-RAM), magneto-optical disk (MO) and digital versatile disk (DVD).

The MIDI interface (I/F) 10 is provided for receiving or delivering performance information of the MIDI standard (MIDI data) from or to other MIDI equipment 10A or the like outside the electronic musical instrument. Further, the communication interface 11 is connected to a communication network 11B, such as a LAN (Local Area Network), the Internet or telephone lines, via which it may be connected to a desired sever computer 11A so as to input a control program and various data to the electronic musical instrument. Thus, in a situation where the control program and various data are not contained in the ROM 2 or hard disk, these control program and data can be downloaded from the server computer 11A. In such a case, the electronic musical instrument, which is a "client", sends a command to request the server computer 11A to download the control program and various data by way of the communication interface 11 and communication network 11B. In response to the command from the client, the server computer 11A delivers the requested control program and data to the electronic musical instrument via the communication network 11B. The electronic musical instrument receives the control program and data via the communication interface 11 and accumulatively store them into the hard disk. In this way, the necessary downloading of the control program and various data is completed. Note that the MIDI interface 10 may be a general-purpose interface rather than a dedicated MIDI interface, such as RS232-C, USB (Universal Serial Bus) or IEEE1394, in which case other data than MIDI messages may be communicated at the same time.

Figure 2:
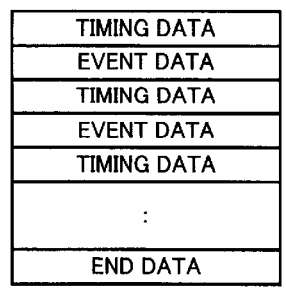
FIG. 2 is a diagram schematically showing an exemplary format of music piece data employed in the electronic musical instrument of FIG. 1.

The following paragraphs describe an exemplary structure of the music piece data, with reference to FIG. 2. As shown, each set of the music piece data comprises a sequence of pairs of timing data and event data, and end data. Each of the timing data indicates event occurrence timing in an absolute time value measured from the beginning of the music piece or from the beginning of a measure or in a relative time value measured from an immediately preceding event. Each of the event data is any one of performance event data, lyrics event data, chord name event data and the like. The performance event data is indicative of any one of performance events such as note-on, note-off, program change, volume and effect events, and includes a mixture of data for a plurality of channels that correspond to a plurality of different performance parts such as melody, rhythm, bass and keyboard parts. The lyrics event data includes data indicative of a character of the lyrics accompanying the melody and event such as a line break or page break to be inserted at the time of displaying the characters of the lyrics on the screen. As noted earlier, the terms "character" as used herein in connection with lyrics refers to a character in the case of a song in mono-syllable language such as Japanese, or a unit word or phonetic unit in the case of a song in poly-syllable language such as English unless specified otherwise. For example, the lyrics event data corresponds one melody note. Each character of the lyrics which corresponds to one lyrics event is inserted at same timing as a note event corresponding to the lyrics event data, and each line break or page break is inserted at timing when such a break is to be made. The chord name event data is indicative of a chord name to be inserted at a performance position where a chord change should be made. The end data is data indicative of an end of the music piece data set in question.

Figure 3:
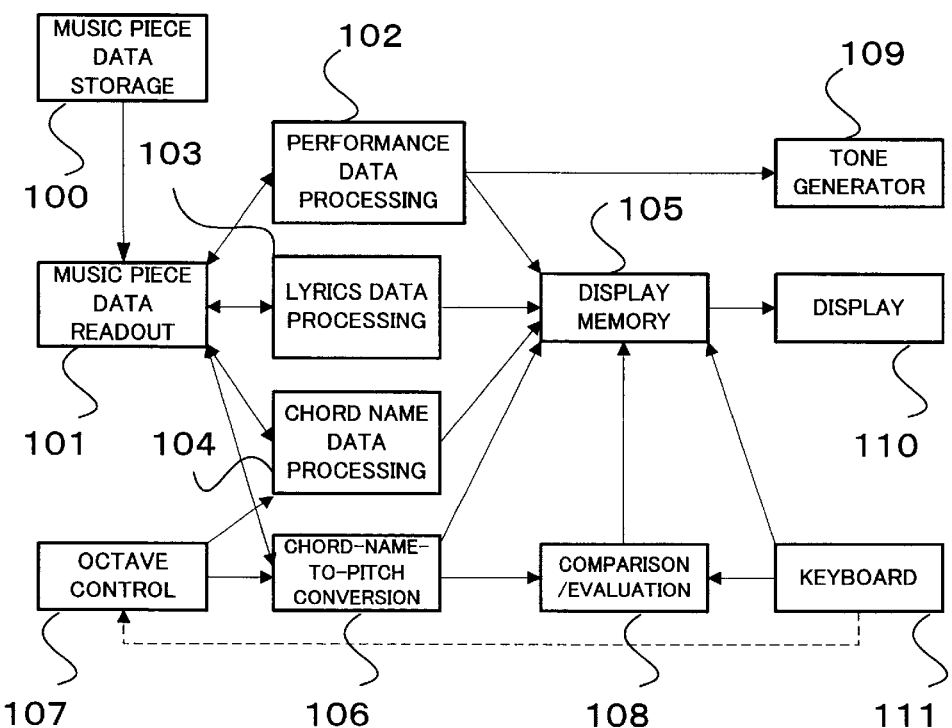
FIG. 3 is a functional block diagram explanatory of various processing performed by the music-piece-data display controlling apparatus under the control of a CPU of the electronic musical instrument.

The electronic musical instrument shown in FIG. 1 not only executes an automatic performance by reading out a user-selected music piece data set from the ROM 2, external storage device 9 or the like, but also displays the contents of the read-out music piece data on the display device 6A in a predetermined format as will be later described in detail. FIG. 3 is a functional block diagram explanatory of various functions or processes performed in the music-piece-data display controlling apparatus under the control of the CPU 1 of the electronic musical instrument; in FIG. 3, arrows indicate primary data flows between the various functions.

Namely, in the illustrated example of FIG. 3, multiple sets of music piece data are stored in a music-piece-data storage section 100; for example, the functions of the ROM 3 and external storage device 9 shown in FIG. 1 correspond to the music-piece-data storage section 100 shown in FIG. 3. However, music piece data received from other MIDI equipment or server computer, and music piece data obtained by recording an actual keyboard performance and then imparting lyrics and chords to the recorded performance may also be stored in the music-piece-data storage section 100. Music-piece-data readout section 101 reads out a selected one of the multiple sets of music piece data. Readout tempo may be either preset or designated by the user for each of the music piece data sets. Further, the readout tempo of any one of the music piece data sets may be modified by the user. Each performance event data in the read-out music piece data is sent to a performance data processing section 102. Every lyrics event data and chord name event data are sent to a lyrics data processing section 103 and chord name data processing section 104, respectively. The music-piece-data readout section 101 pre-reads the performance event data, lyrics event data and chord name event data whenever necessary as will be described later. The performance data processing section 102 passes the performance event data received from the music-piece-data readout section 101 to a tone generator (T.G.) 109. The performance data processing section 102 creates display data to be shown on a keyboard display area of a performance-assisting display section exhibited on a display device 110 and display data to be shown on a lyrics and chord display section (e.g., area for displaying lyrics and chord name) also exhibited on the display device 110, and delivers the thus-created display data to a display memory section 105. In addition, the performance data processing section 102 instructs a music-piece-data readout tempo to the music-piece-data readout section 101 and also gives an instruction for stopping the music piece data readout.

The lyrics data processing section 103 creates, on the basis of the lyrics event data received from the music-piece-data readout section 101, display data to be shown on the lyrics and chord display section of the display device 110 and then sends the thus-created display data to the display memory section 105. The chord name data processing section 104 creates, on the basis of the chord name event data received from the music-piece-data readout section 101, display data to be shown on the performance-assisting display section and display data to be shown on the lyrics and chord display section of the display device 110, and then sends the thus-created display data to the display memory section 105. The chord name event data is also sent from the music-piece-data readout section 101 to a chord-name-to-pitch conversion section 106. The display memory section 105 temporarily stores the display data received from the performance data processing section 102, lyrics data processing section 103 and chord name data processing section 104 and then supplies these display data to the display device 110 for visual display. As will be later described in detail, the display memory section 105 includes a plurality of storage areas corresponding to a plurality of display screens and is capable of storing the display data in these storage areas in a parallel fashion. Only the display data stored in any of the storage regions which has been selected in accordance with a selected screen display mode is supplied from the display memory section 105 to the display device 110 for visual display. On the basis of the chord name event data sent from the music-piece-data readout section 101, the chord-name-to-pitch conversion section 106 determines pitches of chord component tones corresponding to the chord name to be shown on the performance-assisting display section of the display device 110 and sends the thus-determined chord component tone pitches to the display memory section 105. Each of the chord component tone pitches is also sent to a comparison/evaluation section 108 for comparison and evaluation with tone pitch data manually input from a keyboard 111. Octave control section 107 determines, in accordance with an available pitch range of the keyboard 111, whether or not the pitch to be shown on the performance-assisting display section should be shifted by an octave or octaves (octave-shifted). Then, the octave control section 107 supplies the chord name data processing section 104 and chord-name-to-pitch conversion section 106 with octave shift data indicating whether the octave shift is to be made or not. The available pitch range of the keyboard 111 is either designated by the user or identified automatically or semiautomatically. The comparison/evaluation section 108 compares two corresponding tone pitches received from the chord-name-to-pitch conversion section 106 and manually input from the keyboard 111 and thereby evaluates the appropriateness of the keyboard-input tone pitch. Then, the comparison/evaluation section 108 passes the evaluation result to the display memory section 105.

The keyboard 111 is connected via a keyboard interface to the body of the electronic musical instrument; any desired one of keyboards having different numbers of keys can be connected to the body of the electronic musical instrument as desired by the user. The connection of the keyboard 111 may be either by a cable or by wireless means using radio waves, infrared rays or the like. The tone pitch data input from the keyboard 111 is sent to the display memory section 105 and comparison/evaluation section 108. Also, the keyboard 111 supplies the tone pitch data and pitch range information to the octave control section 107, as necessary. The display device 110 visually shows lyrics, chord names, key depression timing, tone pitches, results of the evaluation by the comparison/evaluation section 108, etc. on predetermined display sections such as the above-mentioned performance-assisting display section and lyrics and chord display section.

Figure 4A:
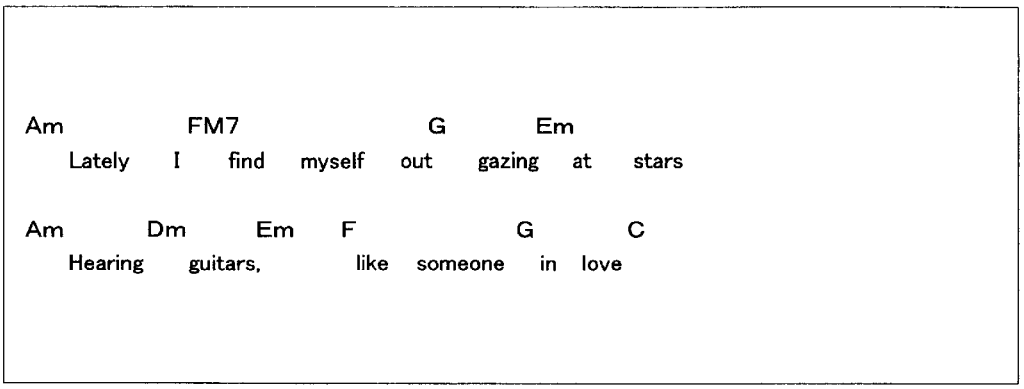
FIG. 4A is a diagram showing an lyrics screen displayed on a lyrics and chord display section of a display in the electronic musical instrument.

Now, a description will be made about exemplary processing performed in the music-piece-data display controlling apparatus under the control of the CPU 1, with reference to FIGS. 4 and 5. FIG. 4 shows specific examples of screens displayed on the lyrics and chord display section of the display device 110, of which FIG. 4A shows an example of a lyrics screen displayed on the lyrics and chord display section.

When a lyrics screen is displayed on the lyrics and chord display section of the display device 110, lyrics (e.g., "Lately I find . . . like someone in love" in the illustrated example) are displayed as in an ordinary karaoke screen and simultaneously chord names (e.g., "Am", "FM7", "G", "Em", "Am", "Dm", "Em", "F", "G" and "C", indicative of a chord progression corresponding to the lyrics are also displayed on the same lyrics screen above the lyrics. One page of the lyrics screen (i.e. a screen capable of being shown at a time on the lyrics and chord display section) is based on a two-line display format (note that each "line" as referred herein comprises a combination of a line of lyrics and a sequence of chord names indicated above the lyrics line), where one lyrics line is deleted from the lyrics screen once the automatic performance has advanced to the end of that line and instead a further next line of the lyrics is read out and added on the lyrics screen. For example, in a situation where first and second lines of the lyrics have already been shown on the screen and once the automatic performance has advanced to the end of the first line, the first line is deleted and replaced by a new or third line, so that the third and second lines are shown on the lyrics screen at this stage. Then, once the automatic performance has advanced to the end of the second line, the second line is deleted and replaced by a new or fourth line, so that the third and fourth lines are shown on the lyrics screen at this stage. Such deletion and addition of the lyrics lines is repeated in accordance with progression of the automatic performance. Thus, by alternately viewing the upper and lower lines on the lyrics screen, the user can know the lyrics and chord names from the beginning to end of the music piece. Note that a changing current performance position of the music piece is indicated here such as by changing the display color of the lyrics character and chord name corresponding to the current performance position; that is, the display color of the character of the lyrics and chord name is changed to another color in accordance with the progression of the performance. More specifically, in the instant embodiment, each currently-performed (reproduced) position (hereinafter referred to simply as "current position") is displayed in a first color such as yellow and each position to which the performance is to advance next (hereinafter referred to simply as "next position") is displayed in a second color, such as orange, different from the first color. Of course, the "current position" and "next position" may each be indicated by, instead of changing the display color, changing the type of the character font used or by changing the shade or filled-in pattern of the character.

In the instant embodiment arranged as above, both the characters of the lyrics and chord name at the current position and the characters of the lyrics and chord name of the next position are indicated in different display styles (e.g., different colors) so that the characters for the current position and the characters for the next position can be readily distinguished from each other even when they are displayed in an overlapping condition.

Further, where there is a discrepancy between the lyrics timing and the chord timing, an additional space is inserted between the lyrics unit words (or characters). Namely, in the illustrated example of FIG. 4A, a chord name "G" is present between the unit words "out" and "gazing" on the first line and thus the unit words "out" and "gazing" are displayed on the screen with an additional space inserted between the unit words. Also, in a case where the chord name change occurs frequently so that displaying the lyrics unit words (or characters) in succession would cause at least a partial overlap between the characters of the corresponding chord names, the lyrics unit words (or characters) are displayed with a similar additional space inserted therebetween. Namely, in the illustrated example of FIG. 4A, two chord names "Em" and "F" are present between the unit words "guitars" and "like", and thus an additional space of a relatively great width is inserted between the unit words.

Namely, when displaying the lyrics unit words (or characters) closely to each other is likely to involve at least a partial overlap between the displayed chord names, the instant embodiment inserts the additional space to increase the interval between the lyrics unit words (or characters) and thereby avoid an undesired overlap between the displayed chord names.

Figure 4B:
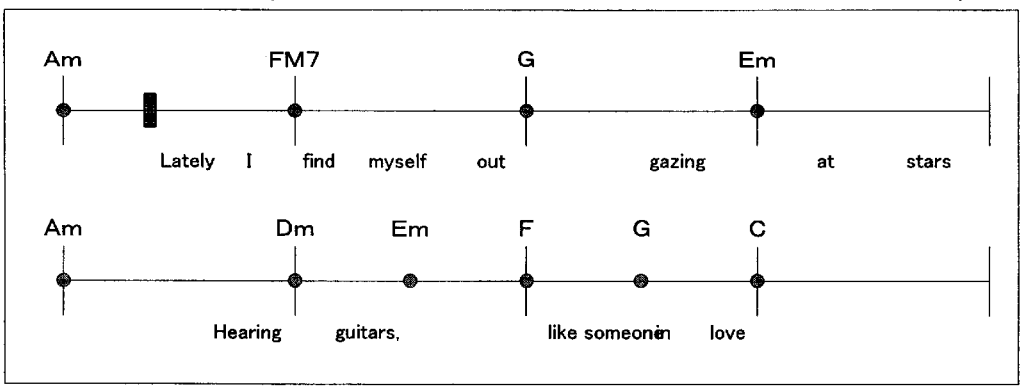
FIG. 4B is a diagram showing an example of a chord change timing screen displayed on the lyrics and chord display section, where lyrics and chord names for four measures are displayed per line.
Figure 4C:
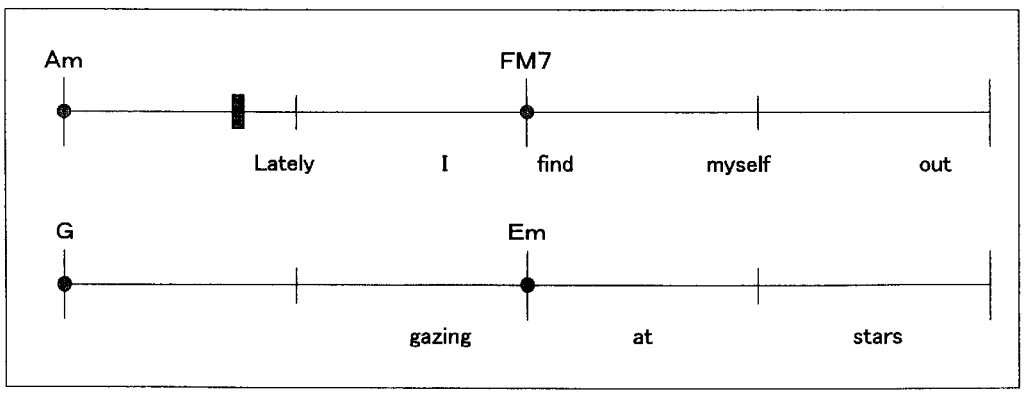
FIG. 4C is a diagram showing another example of the chord change timing screen displayed on the lyrics and chord display section, where lyrics and chord names for two measures are displayed per line.
Figure 4D:
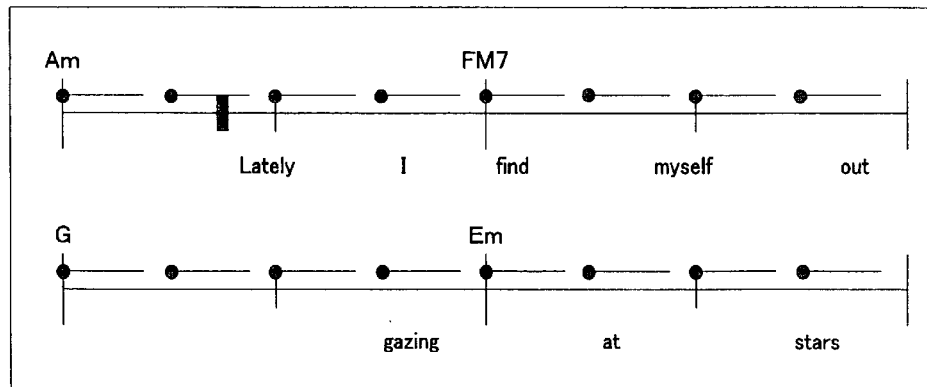
FIG. 4D is a diagram showing still another example of the chord change timing screen with keyboard-part tones displayed on the lyrics and chord display section.

FIGS. 4B to 4D shows several examples of the timing screen displayed on the lyrics and chord display section of the display device 110. Specifically, FIGS. 4B and 4C show exemplary displays of chord change timing. More specifically, FIG. 4B shows an example of the chord change timing screen provided by the instant embodiment, where lyrics and chord names for four measures are displayed per line (this screen will hereinafter be called "timing screen A" for convenience of description). FIG. 4C shows another example of the chord change timing screen provided by the instant embodiment, where lyrics and chord names for two measures are indicated per line (this screen will hereinafter be called "timing screen B" for convenience of description).

In the case where timing screen A or timing screen B is shown on the lyrics and chord display section of the display device 110, a time axis (horizontal axis), measure line or bar line (long vertical line) and third-beat indicating line (short vertical line for use only in timing screen B) are also displayed to allow actual performance timing of the chords to be readily identified on the screen. Similarly to the above-described lyrics screen, timing screen A and timing screen B are each based on a two-line display format. Also, on each of timing screen A and timing screen B, displayed contents, displayed colors of current and next positions, etc. are changed in accordance with the progression of performance in a similar manner to the above-described lyrics screen. Because the lyrics unit words (or characters) and characters of the chord names are displayed along the time axis on the timing screen, they would overlap each other at least partially depending on the performance position. On timing screen A illustrated in FIG. 4B, for example, the unit words "someone" and "in" on the second line are shown as overlapping each other. However, if the unit word (or character) at the current position (e.g., "someone") and the unit word (or character) at the next position (e.g., "in") are displayed in different display colors or the like, the unit word (or character) at the current position and the unit word (or character) at the next position can be distinguished from each other relatively easily even when they are displayed in an overlapping condition to each other. In case the user does not want an overlapping display of the unit words (or characters), he or she can reduce the overlap by using timing screen B (where lyrics and chord names for two measures are indicated per line) in place of timing screen A; that is, the interval between the adjoining unit words (or characters) can be increased by reducing the number of measures to be displayed per line (i.e., from four measures of timing screen A to two measures from timing screen B), and thus the possibility of the lyrics-constituting unit words (or characters) or characters of the chord names overlapping each other can be significantly reduced. As shown in FIG. 4B or FIG. 4C, each chord change timing is indicated by a black dot, and the current position is indicated by a pointer in the form of a black rectangle. The black rectangular pointer moves in a left-to-right direction in accordance with the progression of the music piece. The user can play a desired musical instrument in accordance with the displayed lyrics, by depressing a particular one of the keys of the keyboard at timing when the pointer has reached one of the black dots. It should be appreciated here that the chord change timing and current position may be indicated on the screen in any other appropriate manner than the above-described.

As stated above, the instant embodiment, which is applied as the music-piece-data display controlling apparatus where the characters of the lyrics and chord names are indicated along the time axis, is arranged to provide a plurality of screens of different (time-axial) scales so that any one of the screens can be selected depending on the situation. With this arrangement, the instant embodiment permits selection of a screen display of a smaller time-axial scale exhibiting a wider performance range or section of a music piece where chord changes take place relatively frequently, to thereby allow the user to ascertain preceding chords. Further, for a music piece where chord changes do not take place so frequently, the instant embodiment permits selection of a screen display of a larger time-axial scale exhibiting a narrower performance section of the music piece with increased intervals between the unit words of the lyrics.

FIG. 4D shows an exemplary display of keyboard part tones on the lyrics and chord display section. For the display of keyboard part tones as well, the instant embodiment provides a screen where lyrics and chord names for four measures are indicated per line (this screen will hereinafter be called "timing screen C" for convenience of description), and another screen where lyrics and chord names for two measures are indicated per line (this screen will hereinafter be called "timing screen D" for convenience of description). Specifically, FIG. 4D shows an example of timing screen D alone.

In the keyboard part tone display shown in FIG. 4D, the lyrics characters, characters of the chord names and current-position indicating pointer are displayed in a similar manner to timing screen A and timing screen B described above (see FIGS. 4B and 4C). The keyboard part tone display is different from timing screen A or timing screen B in that each black dot indicative of performance timing is shown at generation timing of a keyboard part tone in the music piece data, not at chord change timing. Further, in this keyboard part tone display, a gate time of each keyboard part tone is indicated by a length of a horizontal bar extending from the black dot apart from the time axis in such a manner that the tone's gate time can be readily read graphically by the user. Note that the keyboard part is, for example, the melody part of the music piece in question. Alternatively, performance data for a particular channel may be used for the keyboard part tone display. In such a case, the particular channel functioning as the keyboard part, for which the keyboard part tone display is made, may be determined such as by ascertaining a program change in the music piece data; for example, if the music piece data for the particular channel include a program change of a piano or organ, then that channel is made the keyboard part. Alternatively, a specific channel may be preset as the keyboard part, or any desired channel may be set as the keyboard part by the user. Flow charts to be described later show a case where the particular channel functioning as the keyboard part is determined on the basis of detection of a program change (see FIG. 9). By viewing timing screen C (i.e., display of eight measures in the keyboard part tone display format; not shown) or timing screen C (i.e., display of four measures in the keyboard part tone display format as shown in FIG. 4D), the user can know approximate performance contents of the keyboard part in the music piece data. Therefore, by performing the displayed chords at the displayed timing, the user is allowed to execute, with relatively simple performance operations, a desired performance while approximating an image or feeling of the music piece as represented by the music piece data. Further, with the instant embodiment, the user can even more enjoy the feeling of performing the music piece, than by performing only to the displayed chord name change timing.

Figure 5A:
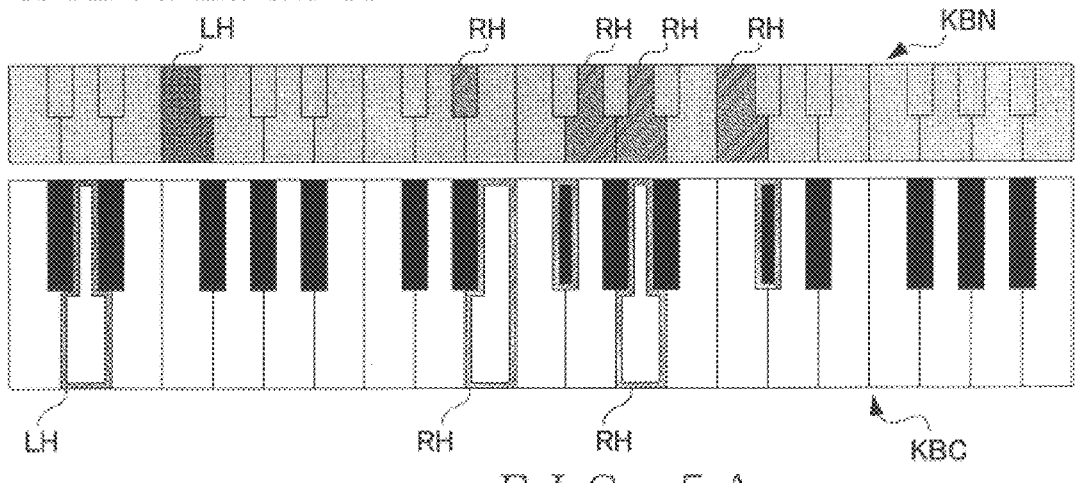
FIG. 5A is a diagram showing a keyboard screen displayed on a performance-assisting display section and more particularly showing component tones of current and next chords to be performed.
Figure 5B:
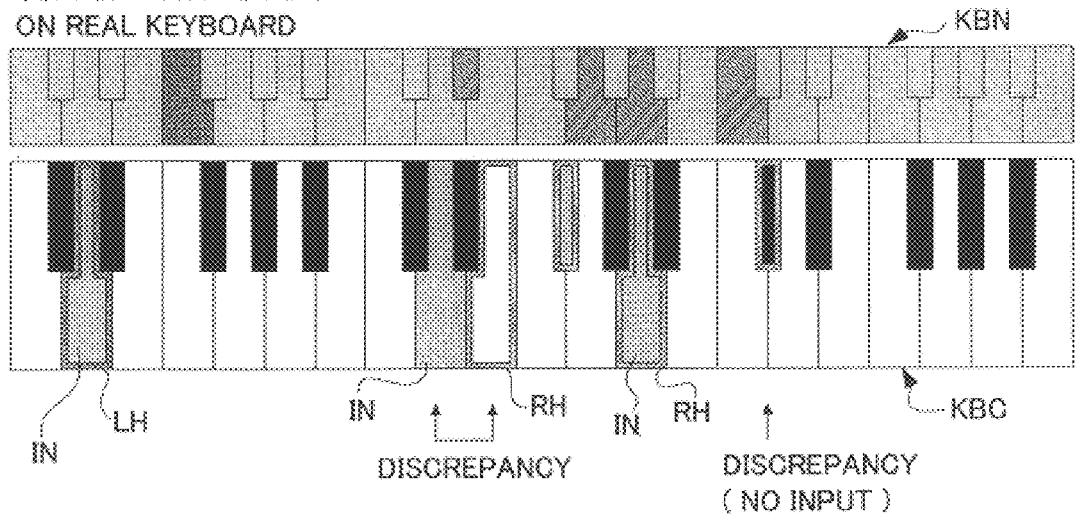
FIG. 5B is a diagram showing a keyboard screen displayed on the performance-assisting display section and more particularly showing a current chord input by a user's performance operation on a keyboard connected to the body of the electronic musical instrument.

In addition to the lyrics and chord display section, the display device 110 includes the performance-assisting display section that shows a screen for assisting the user in playing the musical instrument. On the performance-assisting display section, there are shown a keyboard (such as that of a piano or organ) or frets and strings (such as those of a guitar) and the like. FIGS. 5A and 5B show specific examples of screens shown on the performance-assisting display section; specifically, in FIGS. 5A and 5B, the performance-assisting display section displays a keyboard. More specifically, FIG. 5A shows a screen where component tones of current and next chords are displayed, and FIG. 5B shows a screen where component tones of a current chord have been input by a user's actual manual operation on the real keyboard connected to the body of the electronic musical instrument. In the illustrated example of FIG. 5A, "Dm9" is designated as the current chord name and "F9" is designated as the next chord name, while the illustrated example of FIG. 5B, "Dm9" is designated as the current chord name.

As shown in FIG. 5A, the component tones of the current chord ("Dm9"are displayed in a keyboard section (current keyboard display section) KBC displayed on a lower portion of the screen, and the component tones of the next chord ("F9")are indicated in a keyboard section (next keyboard display section) KBN displayed on an upper portion of the screen. Of the chord component tones, tone pitches to be performed with the left hand and tone pitches to be performed with the right hand are displayed in different display colors or the like (in the illustrated example, by different shades or filled-in patterns for convenience of illustration). Namely, in the illustrated example of FIG. 5A, each key denoted at LH as being filled relatively deeply in a substantial grid pattern represents a tone pitch to be performed with the left hand, and each key denoted at RH as being filled more lightly in a hatched pattern represents a tone pitch to be performed with the right hand. Of course, the present invention is not so limited, and each individual key may be labeled "left" or "right". The display on the current keyboard display section varies in accordance with pitches input by user's actual manual operations on the real keyboard.

In FIG. 5B, there is also provided a keyboard section (current keyboard display section) on a lower portion of the screen, where each key denoted at IN as being filled in grey represents a user-input pitch. However, in the illustrated example of FIG. 5B, there have occurred discrepancies between the pitches of chord component tones and the user-input pitches for some of the keys; here, a tone pitch which the user has failed to input is also considered to be a discrepancy. In this case, it is not possible to judge whether the individual tone pitches input by user's actual manual operations on the real keyboard have been entered with the left hand or right hand, and thus the user-input tone pitches are indicated with no visual indication distinguishing between the left and right hands.

As described above, the performance-assisting display section in the instant embodiment is arranged to indicate the component tones of the current chord separately and distinguishably from the component tones of the next chord; that is, the component tones of the current chord are indicated using the first keyboard diagram (KBC) while the component tones of the next chord are indicated using the second keyboard diagram (KBN). This arrangement provides a clear indication of the correspondence between the keyboard diagrams (virtual keyboard) and the real keyboard connected to the body of the electronic musical instrument. Further, because each tone to be performed with the left hand and each tone to be performed with the right hand are displayed in different display styles, the performance-assisting display section in the instant embodiment allows the user to perform even a complicated chord with simple fingering using the left and right hands. Furthermore, by displaying not only lyrics and chords of a predetermined performance section of a music piece but also component tones of at least a chord to be currently performed, the performance-assisting display section in the instant embodiment allows the user to practice a chord performance as if he or she were enjoying karaoke.

Contents of the various screen displays as set forth above are stored as display data into the display memory section 105, from which they are delivered to the display device 110 for visual display (see FIG. 3). The following paragraphs describe a general organization of the display memory section 105, with reference to FIG. 6 showing an exemplary general organization of the display memory section 105.

Figure 6:
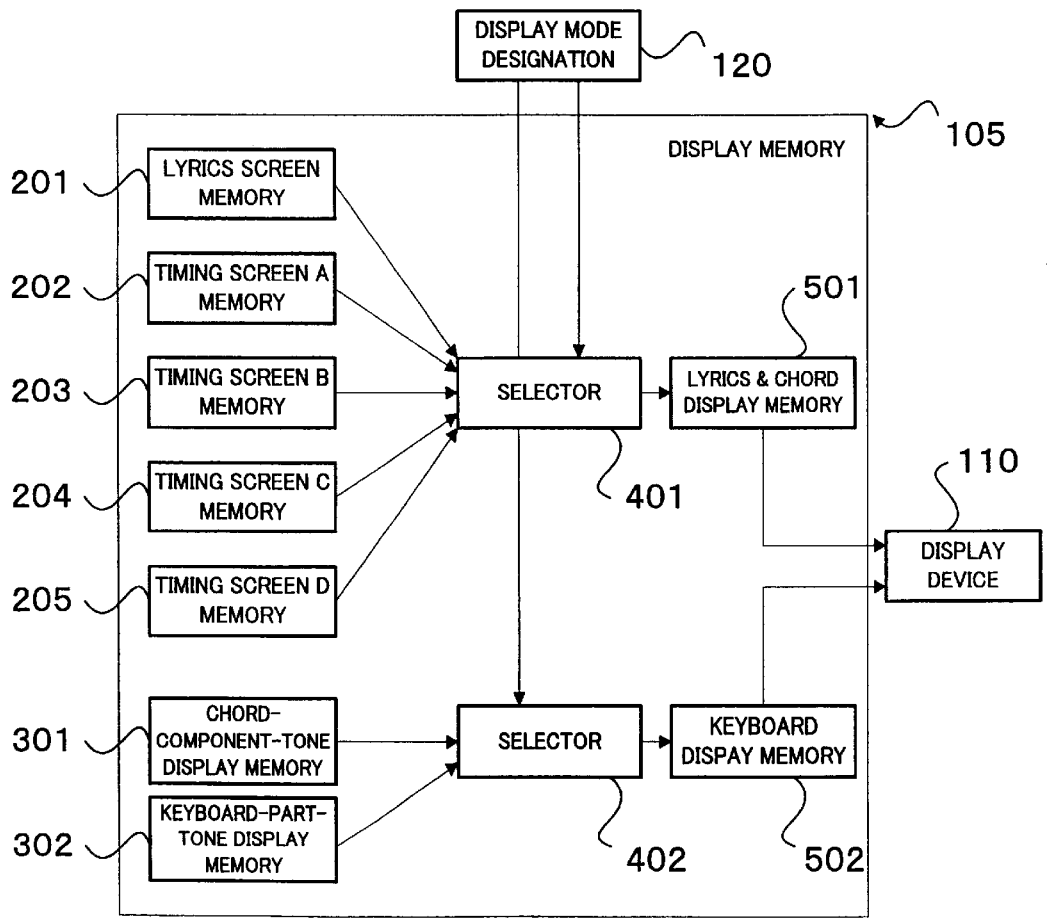
FIG. 6 is a block diagram showing an exemplary general organization of a display memory section shown in FIG. 3.

In the illustrated example of FIG. 6, the display memory section 105 includes a total of five memories for storing display data for use in the lyrics and chord display section. Of the five memories, a lyrics screen memory 201 temporarily stores display data to be used for displaying a lyrics screen on the lyrics and chord display section of the display device 110. Timing screen A memory 202, timing screen B memory 203, timing screen C memory 204 and timing screen D memory 205 temporarily store display data to be used for displaying respective timing screens on the lyrics and chord display section. The display memory section 105 includes two other memories, i.e. chord-component-tone display memory and keyboard-part-tone display memory 301 and 302, for storing display data for use in the performance-assisting display section. These chord-component-tone display memory and keyboard-part-tone display memory 301 and 302 temporarily store display data to be used for a keyboard section on the performance-assisting display section, as will be later described. Any one of the memories 201–205 and 301 and 302 is selected via a selector 401 or 402, respectively, in accordance with a screen display mode designated via a display mode designation section 120. Stored contents of the thus-selected memory are sent to a lyrics and chord display memory 501 or keyboard display memory 502 so as to be used for actual visual display. The instant embodiment creates display data for all of these memories and stores the created display data into the respective memories during a performance, so that even when one screen display mode is switched to another at some point in the performance, it is possible to promptly switch the screen to be shown on the display device 110. Namely, the user is allowed to change the contents to be displayed on the screen, by just switching the screen display mode in the middle of a performance.

Figure 7:
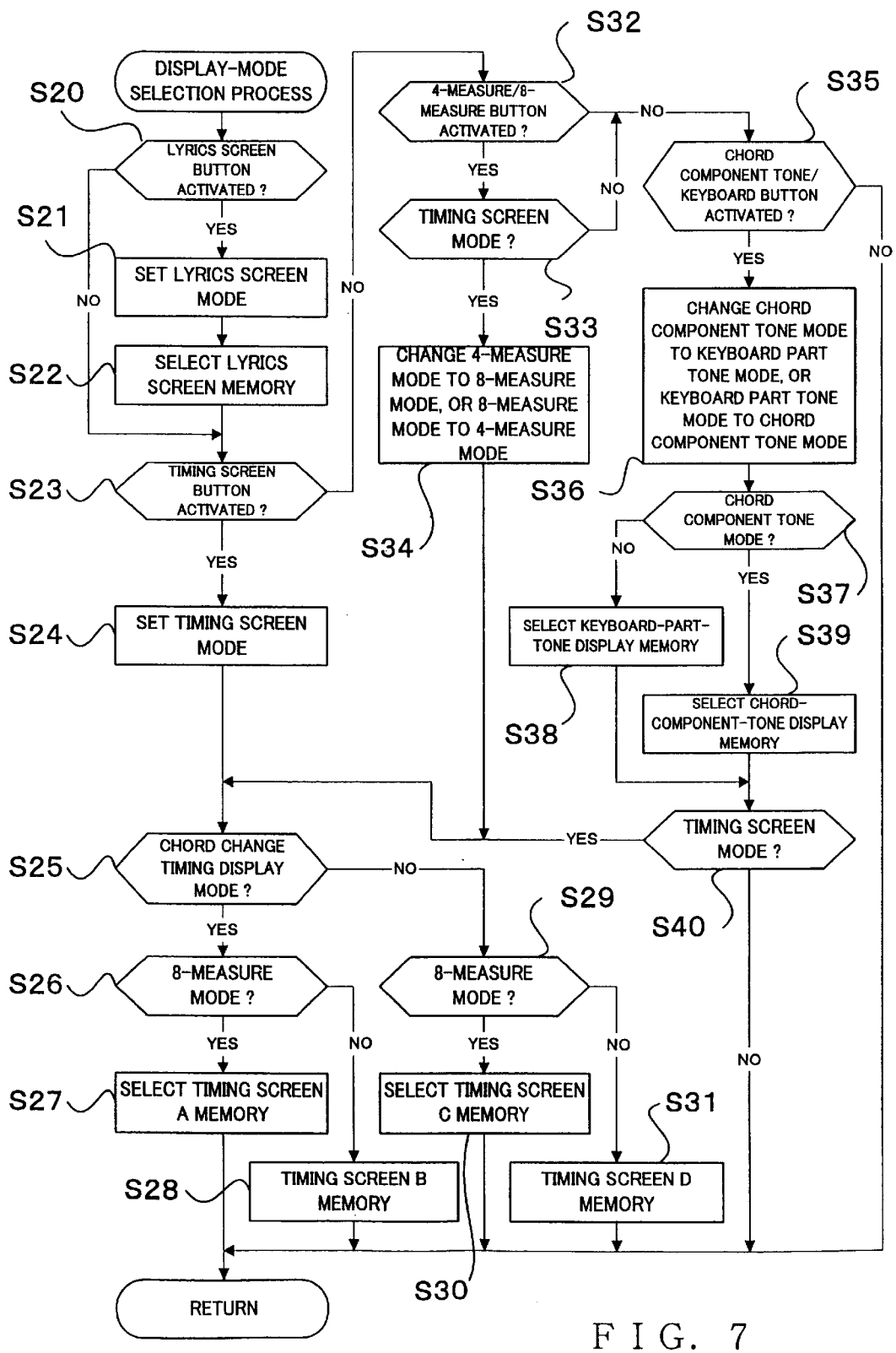
FIG. 7 is a flow chart showing an example of a screen-display-mode selection process that is performed under the control of the CPU in response to activation of any one of operating buttons.

Now, a description will be made about a screen-display-mode selection process performed in the display mode designation section 120, with reference to FIG. 7. FIG. 7 is a flow chart showing an example of the screen-display-mode selection process that is performed under the control of the CPU 1 in response to activation or turning-on of any one of the various buttons mentioned above in relation to FIG. 1.

First, at step S20, it is determined whether or not the lyrics screen button has been activated or turned on. If answered in the affirmative at step S20, the screen display mode is set to a lyrics screen mode at step S21, and the lyrics screen memory 201 is selected at step S22. If the lyrics screen button has not been activated as determined at step S20, the screen-display-mode selection process jumps to step S23, where a determination is made as to whether or not the timing screen button has been activated. With an affirmative answer at step S23, the screen display mode is set to a timing screen mode at step S24, and then the screen-display-mode selection process proceeds to step S25. If the timing screen button has not been activated as determined at step S23, and if the 4 measure/8 measure button has been activated (YES determination at step S32) and the current screen display mode is the timing screen mode (YES determination at step S33), the screen-display-mode selection process proceeds to step S34. At step S34, the screen display mode is set to an eight measure mode if it is currently set at a four measure mode, but is set to the four measure mode if it is currently set at the eight measure mode. After that, the selection process goes to step S25.

On the other hand, if the 4 measure/8 measure button has not been activated as determined at step S32, or if the current screen display mode is not the timing screen mode (NO determination at step S33) although the 4 measure/8 measure button has been activated (YES determination at step S32), the screen-display-mode selection process proceeds to step S35. At step S35, a determination is made as to whether or not the chord component tone/keyboard button has been activated. If the chord component tone/keyboard button has not been activated (NO determination at step S35), the screen-display-mode selection process is brought to an end. If the chord component tone/keyboard button has been activated as determined at step S35, the selection process goes to step S36. At step S36, the screen display mode is set to a keyboard part tone mode if it is currently set at a chord component tone mode, but is set to the chord component tone mode if it is currently set at the keyboard part tone mode. Then, if the thus-set screen display mode is the chord component tone mode (YES determination at step S37), then the chord-component-tone display memory 301 is selected at step S39. If the screen display mode is not the chord component tone mode (NO determination at step S37), then the keyboard-part-tone display memory 302 is selected at step S38. Note that the "chord component tone mode" is a mode where chord component tones are displayed, as shown for example in FIG. 5A or 5B, on the performance-assisting display section of the display device 110 and the "keyboard part tone mode" is a mode where tones of the keyboard part (e.g., melody part) are displayed on the performance-assisting display section. Then, at step S40, a determination is made as to whether the current screen display mode is the timing screen mode. If answered in the affirmative at step S40, the selection process jumps to step S25; otherwise (NO determination at step S40), the selection process is brought to an end.

At step S25, a determination is made as to whether the current screen display mode is a chord-change-timing display mode. If the current screen display mode is the chord-change-timing display mode as determined at step S25 and also the eight measure mode is on (i.e., YES determination at both step S25 and step S26), then the timing screen A memory 202 is selected at step S27. If the current screen display mode is the chord-change-timing display mode and the eight measure mode is not on (i.e., YES determination at step S25 and NO determination at step S26), then the timing screen B memory 203 is selected at step S28. If the current screen display mode is not the chord-change-timing display mode and the eight measure mode is on (i.e., NO determination at step S25 and YES determination at step S26), then the timing screen C memory 204 is selected at step S30. Further, if the current screen display mode is not the chord-change-timing display mode and the eight measure mode is not on (i.e., NO determination at both step S25 and step S26), then the timing screen D memory 205 is selected at step S31.

By setting a current screen display mode and selecting one of the memories corresponding to the current screen display mode in the above-mentioned manner, a particular screen to be shown on the display device 110 is determined. Namely, upon activation of the lyrics button, the lyric screen is selected to replace the timing screen, in which case the keyboard display remains unchanged. Upon activation of the timing screen button, the timing screen is selected to replace the lyrics screen. Which of the timing screens A–D is to be selected varies depending on the currently-set screen display mode, i.e., whether the current screen display mode is the four measure mode or eight measure mode and whether the current screen display mode is the chord-change-timing display mode or keyboard-part-tone display mode. More specifically, when the current screen display mode is a combination of the eight measure mode and chord-change-timing display mode, timing screen A is selected. When the current screen display mode is a combination of the four measure mode and chord-change-timing display mode, timing screen B is selected. Further, when the current screen display mode is a combination of the eight measure mode and keyboard-part-tone display mode, timing screen C is selected. Furthermore, when the current screen display mode is a combination of the four measure mode and keyboard-part-tone display mode, timing screen D is selected. In an initial state, the combination of the eight measure mode and chord-change-timing display mode, for example, is set as the current screen display mode, and thus timing screen A is selected. Each time the 4 measure/8 measure button is activated, a shift is made between the four measure mode and the eight measure mode. When the 4 measure/8 measure button is activated in the lyrics screen mode, the activation of the 4 measure/8 measure button is made invalid, so that the lyrics screen mode is maintained. When the 4 measure/8 measure button is activated in the timing screen mode, the current timing screen is switched to another timing screen depending on which of the four measure mode and eight measure mode is currently set. Shift between the chord-change-timing display mode and the keyboard-part-tone display mode may be made in response to a shift between the chord component tone mode and the keyboard part mode on the performance-assisting display section. For example, once the chord component tone/keyboard button is activated, the display mode of the performance-assisting display section is shifted between the chord component tone mode and the keyboard part mode, in response to which the display mode of the lyrics and chord display section may be shifted to any one of the chord-change-timing display mode and the keyboard-part-tone display mode.

As set out above, the instant embodiment is arranged to carry out various processes, pertaining to display of music piece data, under the control of the CPU 1. Namely, the various processes of the inventive music-piece-data display controlling apparatus are carried out by the CPU 1 running predetermined software programs. Of course, the present invention may be implemented by any other suitable means than the computer software, such as a combined use of a DSP (Digital Signal Processor) and microprograms or a hardware apparatus including discrete circuits, integrated circuit, large-scale integrated circuit or gate arrays.

Next, the processing of the music-piece-data display controlling apparatus performed under the control of the CPU 1 in relation to the individual functions of FIG. 3 will be described with reference to FIGS. 8 to 14.

Figure 8:
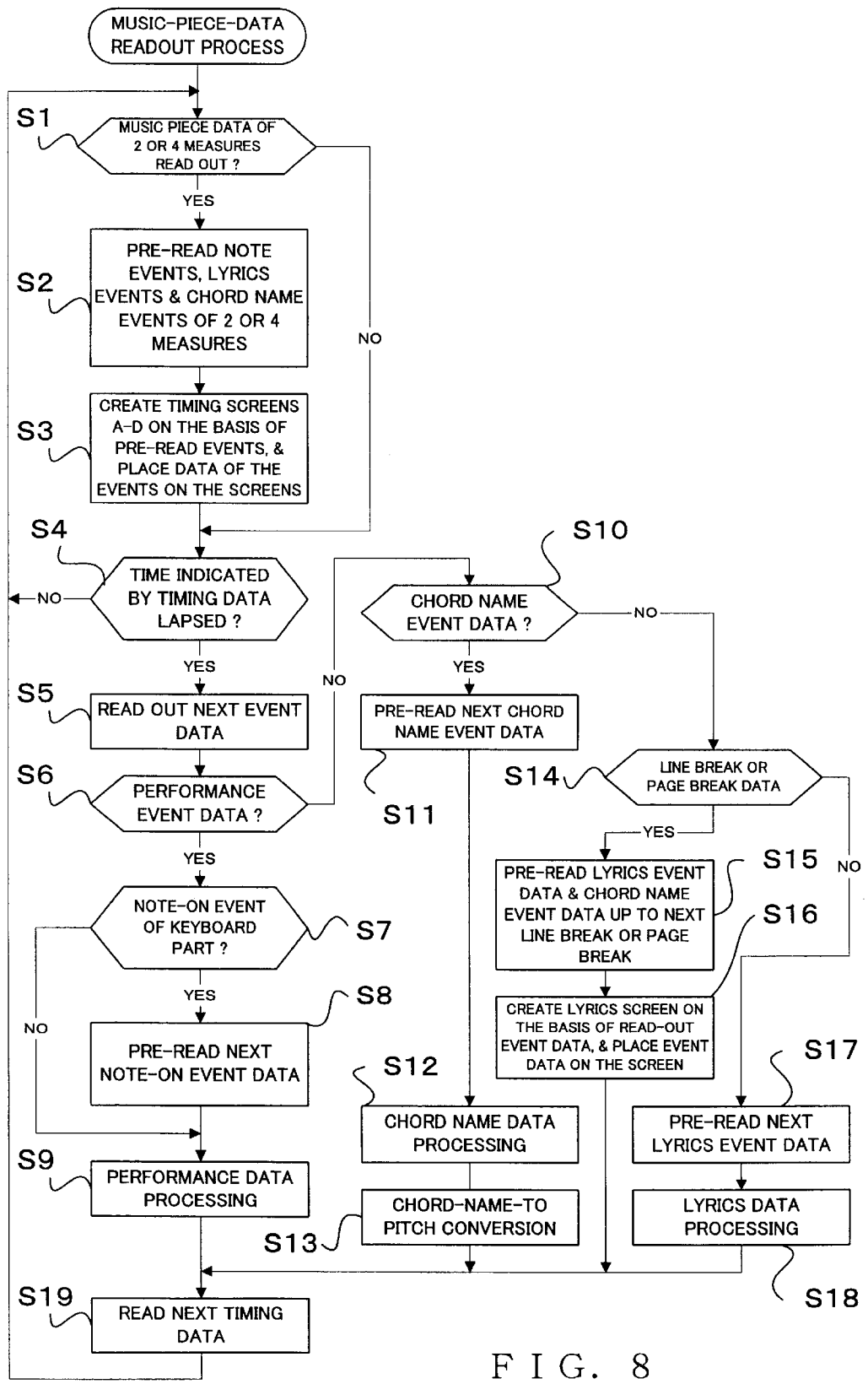
FIG. 8 is a flow chart showing an example of a music-piece-data readout process performed under the control of the CPU.

First, a description will be made about processing performed in the music-piece-data readout section 101, with reference to FIG. 8 which is a flow chart showing an example of a music-piece-data readout process executed under the control of the CPU 1; note that no description is made herein about some of the operations performed during the music piece data readout, such as readout of leading timing data.

At step S1, it is determined whether or not the music piece data for two or four measures have been read out. If answered in the negative at step S1, the music-piece-data readout process jumps to step S4. If the music piece data for two or four measures have been read out as determined at step S1 (YES determination at step S1), the readout process moves on to step S2 in order to pre-read note events, lyrics events and chord name events in the two or four measures of the keyboard part. Then, timing screens are created on the basis of the pre-read events and various display data corresponding to the pre-read events are placed on the screens at step S3. Namely, step S2 pre-reads the note events of the keyboard part in the two or four measures which are to be used for creating timing screens C and D as well as the lyrics events and chord name events in the two or four measures which are to be used for creating timing screens A–D. On each of the four-measure screens (i.e., timing screens B and D), the pre-read data of the two measures cover one half of the four measures, while on each of the eight-measure screens (i.e., timing screens A and C), the pre-read data of the four measures cover one half of the eight measures. Then, characters of the lyrics and chords are placed onto respective positions along the time axis. However, if timing of the adjoining unit words or characters of the lyrics and adjoining chords is too close to each other, then the unit words or characters of the lyrics and chords may be displayed in an overlapping condition.

At step S4, a determination is made as to whether a time indicated by timing data has lapsed or not. Namely, once timing data is read out from among the music piece data, the time indicated by the read-out timing data is counted. If the time indicated by the timing data has lapsed (YES determination at step S4), this means that time to read out next event data has arrived, and thus the next event data is read out at step S5. Then, at step S6, it is determined whether the event data read out at step S5 is performance event data. If the read-out event data is performance event data as determined at step S6, a further determination is made at step S7 as to whether or not the performance event data represents a note-on event of the keyboard part. If the performance event data represents a note-on event of the keyboard part (YES determination at step S7), next note-on event data of the keyboard part is pre-read at step S8. If, on the other hand, the performance event data read out at step S5 does not represents a note-on event of the keyboard part (NO determination at step S7), the readout process bypasses step S8, i.e. does not pre-read next note-on event data of the keyboard part. The data thus obtained are used for keyboard part tone display. After that, the performance data processing section 102 is activated at step S9.

In the event that the event data read out at step S5 is not performance event data (NO determination at step S6) but chord name event data as determined at step S10, next chord name event data is also pre-read at step S11. The data thus obtained are used to change the respective display styles (e.g., display colors) of the chord names and display chord components tones. After that, the chord name data processing section 104 and chord-name-to-pitch conversion section 106 are activated at steps S12 and S13, respectively. If the read-out event data is not chord name event data (NO determination at step S10), then it is lyrics event data. So, at step S14, it is determined whether the read-out lyrics event data is one of line break and page break data. If answered in the affirmative at step S14, step S15 pre-reads lyrics event data and chord event data up to a next line break or page break. Then, a lyrics screen is created on the basis of the read-out event data and display data are written onto the screen at step S16. At this time, the thus-obtained data are simultaneously stored into not only the lyrics screen memory 201 but also all of the display memories 202 to 205 of FIG. 6 corresponding to timing screens A–D so that display data for timing screens A–D are created simultaneously. Namely, step S16 also creates gate time and other data to be displayed on timing screens C and D. Also, at this time, screen display is made in accordance with the currently-selected display mode. The thus-obtained data are used as display data for the timing screens as well as for the lyrics screen. Further, at this time, the lyrics screen is updated alternately in its upper and lower halves, in a similar manner to the timing screens.

If the read-out lyrics event data is not one of line break and page break data as determined at step S14, i.e. if the read-out lyrics event data is ordinary lyrics event data, next lyrics event data is pre-read at step S17. The thus-obtained data are used to change the respective display styles (e.g., display colors). Then, the lyrics data processing section 103 is activated at step S18, and next timing data is read out at next step S19. Following step S19, the readout process reverts to step S1 in order to repeat the operations of steps S1 to S19.

Figure 9:
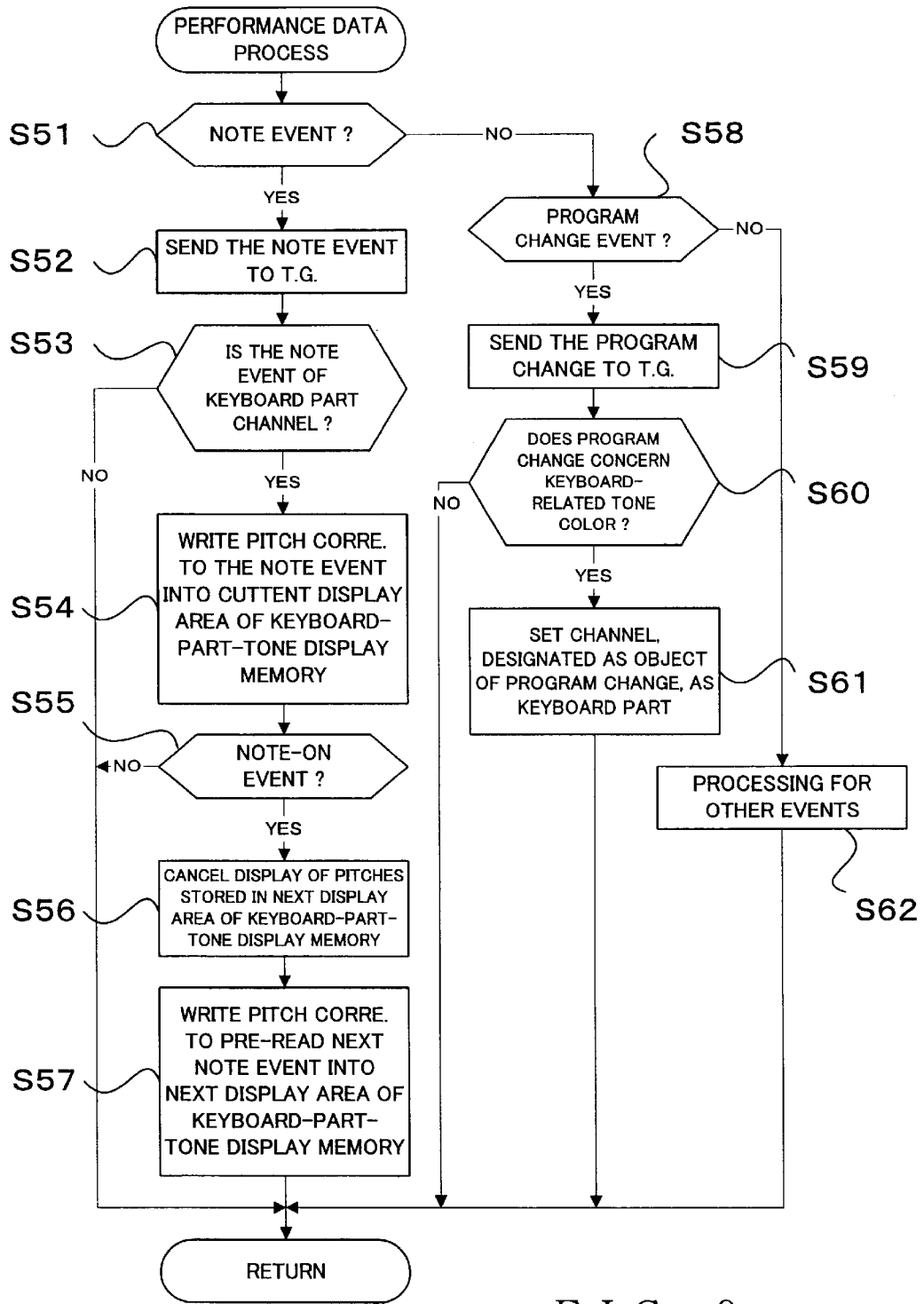
FIG. 9 is a flow chart showing an example of a performance data process executed under the control of the CPU.

The following paragraphs describe processing performed in the performance data processing section 102, with reference to FIG. 9 which is a flow chart showing an example of a performance data process executed under the control of the CPU 1.

At step S51, a determination is made as to whether read-out performance data represents a note event. With an affirmative (YES) answer at step S51, the note event is supplied to the tone generator at step S52. Further, it is determined at step S53 whether the read-out note event is of the channel currently set as keyboard part. If the read-out note event is of the keyboard part channel (YES determination at step S53), display data representative of a tone pitch corresponding to the note event is written into a current display area of the keyboard-part display memory at step S54. Here, if the note event is an note-on event, the tone pitch is displayed or highlighted, but if the note event is an note-off event, the tone pitch display is canceled, or the display (or highlighted display) of the tone pitch is canceled. In the event that an octave shift is instructed, the tone pitch is displayed after being octave-shifted in such a manner that it falls within the available pitch range of the keyboard. At next step S55, a determination is made as to whether the note event is a note-on event or not. If answered in the affirmative at step S55, display of the tone pitch stored in a next display area of the keyboard-part display memory is canceled at step S56. Then, at step S57, the tone pitch corresponding to the pre-read next note event is written into the next display area of the keyboard-part display memory. At this time too, in the event that an octave shift is instructed, the tone pitch is displayed after being octave-shifted in such a manner that it falls within the available pitch range of the keyboard. Unlike in the display of the chord component tones, no visual distinction between the left and right hands is made in the display of the keyboard part.

If, on the other hand, the read-out performance data does not represent a note event as determined at step S51, a further determination is made at step S58 as to whether the read-out performance data represents a program change. If answered in the affirmative at step S58, the program change event is supplied to the tone generator at step S59. Then, it is ascertained at step S60 whether the program change concerns a keyboard-related tone color. If the program change concerns a keyboard-related tone color (YES determination at step S60), the channel designated as an object of the program change is set as the keyboard part at step S61. Namely, as long as the read-out program change is a keyboard-related tone color such as a tone color of a piano or organ, the channel designated as an object of the program change is set as the keyboard part channel. The channel set as the keyboard channel here is used for the above-mentioned tone pitch display. If the read-out performance data does not represent a program change (NO determination at step S58), processing for other events is carried out at step S62. Examples of the other event processing include setting a volume corresponding to a volume event, setting an effect corresponding to an effect-related event, setting a readout tempo corresponding to a tempo event and readout stop control corresponding to an end event.

Figure 10:
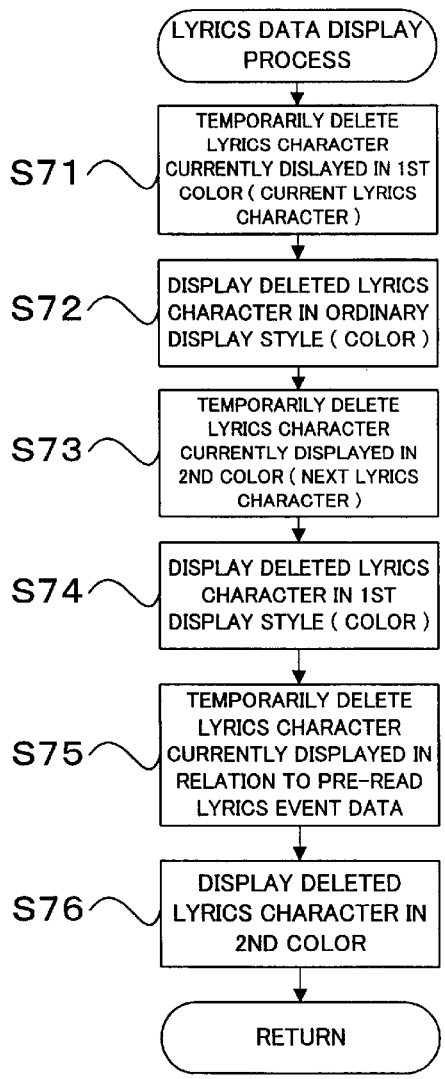
FIG. 10 is a flow chart showing an example of a lyrics data display process executed under the control of the CPU.

The following paragraphs describe processing performed in the lyrics data processing section 103, with reference to FIG. 10 which is a flow chart showing an example of a lyrics data display process executed under the control of the CPU 1. This lyrics data display process is intended to execute data writing (storage) and data deletion to and from all of the lyrics screen memory and timing screens A to D (see FIG. 6).

First, a lyrics character being displayed in the first display color (i.e., current lyrics character) is deleted temporarily at step S71, and then the thus-deleted lyrics character is displayed in the ordinary display style (e.g., ordinary display color) at step S72. Further, a lyrics character being displayed in the second display color (i.e., next lyrics character) is deleted temporarily at step S73, and then the thus-deleted lyrics character is displayed in the first display style (e.g., first display color) at step S74. Furthermore, a lyrics character being displayed in relation to pre-read lyrics event data is deleted temporarily at step S75, and then the thus-deleted lyrics character is displayed in the second display style (e.g., second display color) at step S76. In this way, the instant lyrics data process displays a succession of lyrics characters on the lyrics screen while changing the display color.

Figures 11A, 11B:
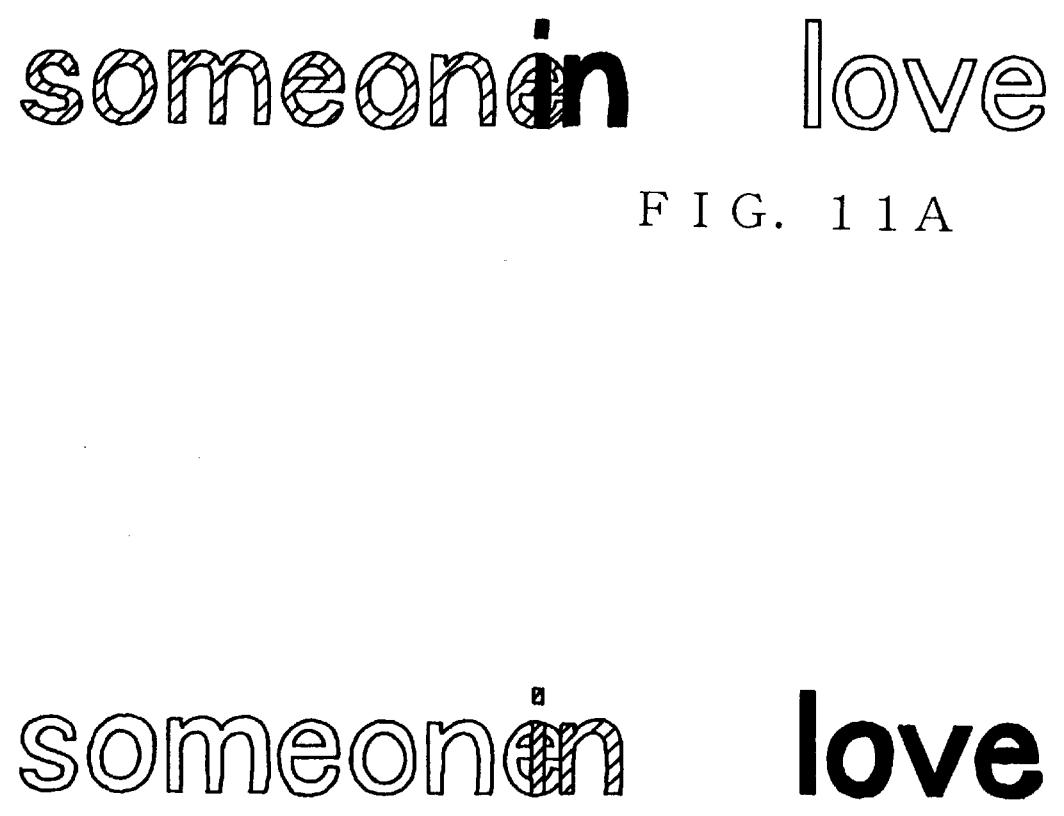

Here, a brief explanation is made about the display color change on the screen which is made through the above-mentioned lyrics data display process, with reference to FIG. 11. FIGS. 11A and 11B are diagrams explaining how the display color change is made to the lyrics unit words (or characters) in relation to the words in the seventh measure of FIG. 4B. Particularly, FIGS. 11A and 11B show an overlap between the unit words. Further, in 11A and 11B, each hatched character represents a character displayed in the first display character, each character filled in black represents a character displayed in the second display color, and each white-out character represents a character displayed in an ordinary color different from the first and second display colors.

More specifically, FIG. 11A shows a situation where a unit word "someone" of the lyrics is being displayed as current lyrics characters. Namely, in the illustrated example of FIG. 11A, the unit word "someone" is being displayed in the first display color, a next unit word "in" in the second display color, and a further next unit word "love" in the ordinary display color. Once lyrics event data representative of the unit word "in" is read out in such a situation, the unit word "in" is displayed as the current lyrics characters, as shown in FIG. 11B. Namely, at this time, "someone" having so far been displayed in the first display color is deleted and then displayed again in the ordinary display color (see steps S71 and S72 of FIG. 10), "in" having so far been displayed in the second display color is deleted and then displayed in the first display color (see steps S73 and S74 of FIG. 10), and "love" having so far been displayed in the ordinary display color is deleted and then displayed in the second display color (see steps S75 and S76 of FIG. 10). This way, the display of the current lyrics characters shifts from "someone" to "in".

Note that in the overlapping portion between the lyrics characters, the display color of any one of the overlapping lyrics characters may be displayed with priority over the display color of the other lyrics character. For example, the first display color representing the current lyrics unit word (or character) may be displayed over the second display color representing the next lyrics unit word (or character). Conversely, the second display color representing the next lyrics unit word (or character) may be displayed over the first display color representing the current lyrics unit word (or character). Further, although the preceding paragraphs have described the case where three different display colors, i.e. the first, second and ordinary display colors, are used to display the lyrics characters, just two or more than three display colors may be used as long as the current and next lyrics characters can be visually distinguished from each other. Of course, the display color may be changed for each character rather than for each unit word.

Figure 12:
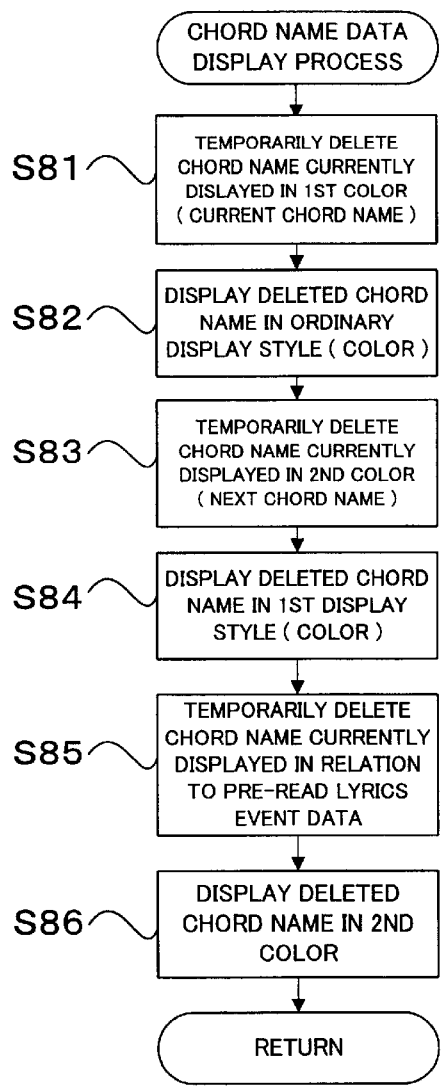
FIG. 12 is a flow chart showing an example of a chord-name-data display process executed under the control of the CPU.

The following paragraphs describe processing performed in the chord name data processing section 104, with reference to FIG. 12 which is a flow chart showing an example of a chord-name-data display process executed under the control of the CPU 1. This chord-name-data display process is intended to execute data writing (storage) and data deletion to and from all of the lyrics screen memory and timing screens A to D (see FIG. 6).

First, a chord name being displayed in the first color (i.e., current chord name) is deleted temporarily at step S81, and then the thus-deleted chord name is displayed in the ordinary display style (e.g., ordinary display color) at step S82. Further, a chord name being displayed in the second color (i.e., next chord name) is deleted temporarily at step S83, and then the thus-deleted chord name is displayed in the first display style (e.g., first display color) at step S84. Furthermore, a chord name being displayed in relation to pre-read chord name data is deleted temporarily at step S85, and then the thus-deleted chord name is displayed in the second display style (e.g., second display color) at step S86. In this way, the instant chord-name-data display process displays a succession of chord names on the screen while changing the display color.

The display color change of the chord names is made in a similar manner to that of the lyrics characters and therefore will not be described here to avoid unnecessary duplication.

Figure 13:
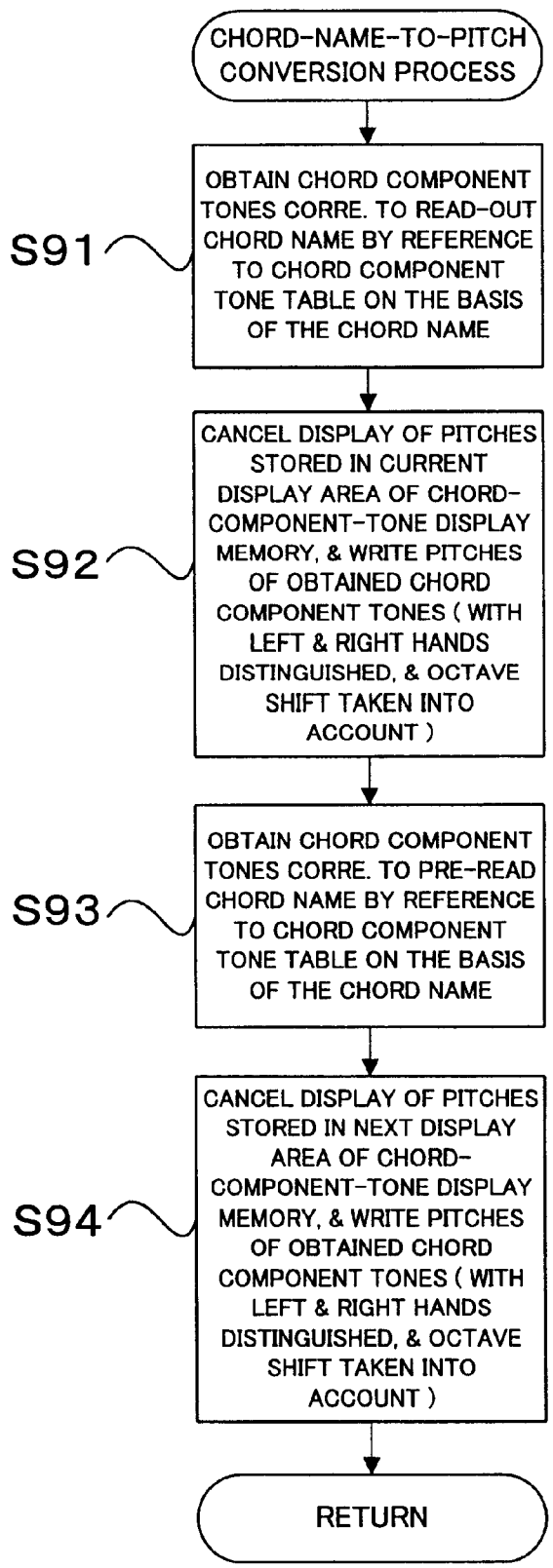
FIG. 13 is a flow chart showing an example of a chord-name-to-pitch conversion process executed under the control of the CPU.

The following paragraphs describe processing performed in the chord-name-to-pitch conversion section 106, with reference to FIG. 13 which is a flow chart showing an example of a chord-name-to-pitch conversion process executed under the control of the CPU 1.

First, at step S91, chord component tones corresponding to a read-out chord name are obtained by reference to a chord component tone table on the basis of the read-out chord name. The chord component tone table has stored therein pitches of chord component tones in corresponding relation to a plurality of chord names, as well as information indicating, for each of the chord component tones, which of the left and right hands should be used to perform the chord component tone. At step S92, display of tone pitches stored in a current display area of the chord-component-tone display memory 301 is canceled and the pitches of the obtained chord component tones are written. In this case, distinction between the left and right hands is made on the basis of the left/right hand information from the table. In the event that an octave shift is instructed, the tone pitches are octave-shifted in such a manner that they fall within the available pitch range of the keyboard. Then, at step S93, chord component tones corresponding to a pre-read chord name are obtained by reference to the chord component tone table based on the pre-read chord name. At next step S94, display of tone pitches stored in a next display area of the chord-component-tone display memory 301 is canceled and the pitches of the obtained chord component tones are written. In this case too, visual distinction between the left and right hands is made on the basis of the left/right hand information from the table. In the event that an octave shift is instructed, the tone pitches are octave-shifted in such a manner that they fall within the available pitch range of the keyboard. This way, the component tones corresponding to the chord names are displayed on the screen.

Figure 14:
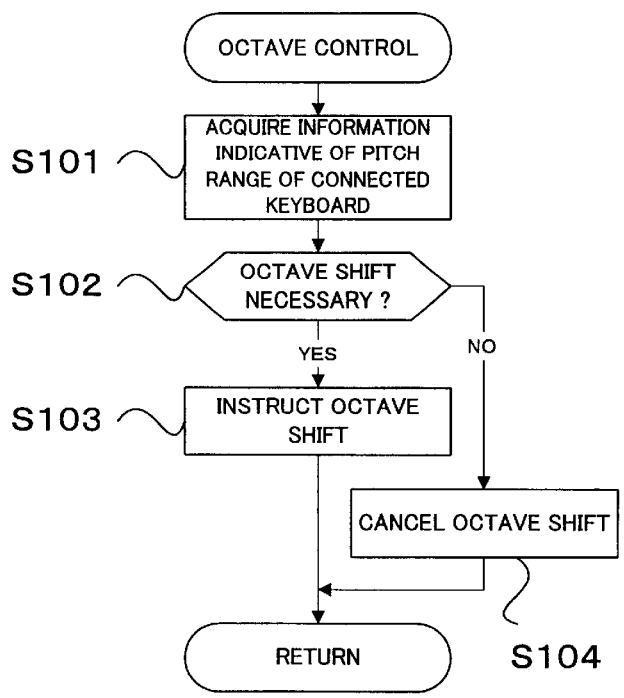
FIG. 14 is a flow chart showing an example of an octave control process executed under the control of the CPU.

The following paragraphs describe processing performed in the octave control section 107, with reference to FIG. 14 which is a flow chart showing an example of an octave control process executed under the control of the CPU 1.

First, at step S101, information is acquired or identified which pertains to the available pitch range of the keyboard connected to the body of the electronic musical instrument. The information pertaining to the available pitch range of the keyboard may be acquired by the user designating a pitch range of, say, "F2 to C5". Alternatively, the information pertaining to the available pitch range of the keyboard may be acquired by having the user depress highest-pitch and lowest-pitch keys and obtaining highest and lowest note numbers corresponding to the depressed keys. In another alternative, a command requesting the available pitch range is transmitted to the keyboard, in response to which the keyboard sends pitch range information to the octave control section 107. Then, at step S102, it is determined whether an octave shift is necessary or not, on the basis of the information pertaining to the available pitch range of the keyboard used and tone pitch data (i.e., chord component tone data) to be displayed. Namely, this step S102 determines whether the pitches of the chord component tones need be subjected to an octave shift so that they appropriately fall within the available pitch range of the keyboard acquired or determined in the above-mentioned manner. If the octave shift is necessary as determined at step S102, the octave control process goes to step S103 in order to give an instruction that the chord component tones should be displayed after being octave-shifted. If the octave shift is not necessary (NO determination at step S102), the octave shift is canceled at step S104. The octave shift instructed by the octave control section 107 may be across two or more octaves rather than just one octave. In this case, either or both of the higher and lower tone pitches input manually from the keyboard may be octave-shifted.

By thus identifying the available pitch range of the connected keyboard and displaying each tone that is to be performed with an octave shift, the octave control process in the instant embodiment can display chord component tones in a turn-back fashion. Thus, even where a manual performance is executed using a keyboard of a narrow pitch range, it is possible to reliably eliminate the possibility that a tone pitch non-producible by the keyboard is designated.

Figure 15:
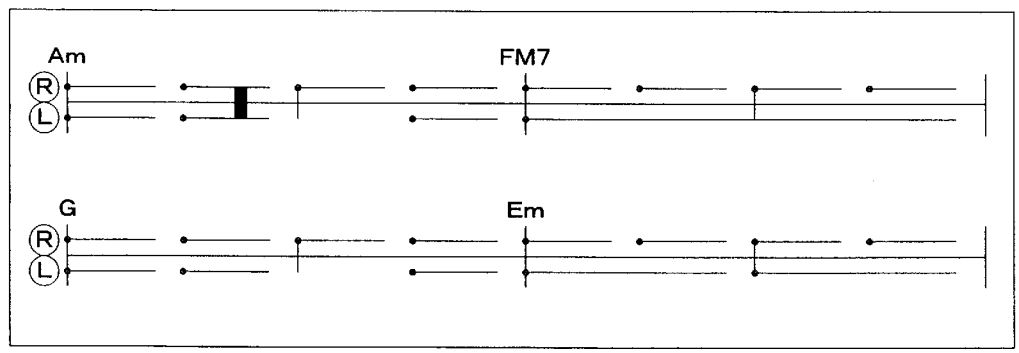
FIG. 15 is a diagram showing a modified timing screen on the lyrics and chord display section.

The following paragraphs a modification of the lyrics and chord display section. FIG. 15 is a diagram showing a modified timing screen on the lyrics and chord display section; note that FIG. 15 shows only a four-measure display case.

In timing screen C (eight-measure display in the keyboard-part-tone display mode, not shown in FIG. 15) or timing screen D (four-measure display in the keyboard-part-tone display mode as shown in FIG. 15), the left-hand part and right-hand part are shown separately for clear visual distinction. Namely, label "R" represents the right-hand part while label "L" represents the left-hand part. In this case, the keyboard part is set previously in two different channels in such a manner that one of the channels is associated with the right-hand part and the other channel is associated with the left-hand part. The left-hand and right-hand parts may be determined in any one of the following manners. As a first approach, particular channels may be preset in corresponding relation to the right-hand and left-hand parts; for example, "channel 1" may be set as the right-hand part and "channel 2" may be set as the left-hand part. As a second approach, pitch ranges covered by performance data in each of the channels may be determined so that the channel having performance data of a higher pitch range is set as the right-hand part while the channel having performance data of a lower pitch range is set as the left-hand part. As a third approach, the number of tones in each of the channels may be determined so that the channel having a greater number of tones (i.e., the one that can be regarded as having chord component tones) is set as the right-hand part while the channel having a smaller number of tones (i.e., the one that can be regarded as having bass tones) is set as the left-hand part; conversely, the channel having a greater number of tones may be set as the left-hand part and the channel having a smaller number of tones may be set as the right-hand part. Whereas the modification of FIG. 15 is shown and described as displaying both of the right-hand and left-hand parts, the timing screen may be arranged to display any one of the right-hand and left-hand parts. Further, an arrangement may be made to allow the user to selectively display only the right-hand part or only the left-hand part or both of the right-hand and left-hand parts.

By displaying chord names on the basis of the chord name data and displaying performance timing of the right-hand and left-hand parts separately from each other in the above-mentioned manner, the instant embodiment affords the benefit that the user can readily know at what timing a performance, based on a same kind of chord in different pitch ranges, should be carried out with the left and right hands.

It should be appreciated that the electronic musical instrument to which the music-piece-data display controlling apparatus of the present invention is applied may be of any other type than the keyboard-based type, such as a stringed, wind or percussion instrument. Further, the music-piece-data display controlling apparatus of the present invention may be applied to a type of electronic musical instrument where the tone generator apparatus and automatic performance apparatus are provided separately from each other and interconnected via communication facilities such as a MIDI interface and communication network, in addition to the above-described type of electronic musical instrument where the tone generator apparatus and automatic performance apparatus are incorporated together in the body of the instrument. Furthermore, the music-piece-data display controlling apparatus of the present invention may be implemented by a combination of a personal computer and application software, in which case processing programs may be supplied to the music-piece-data display controlling apparatus from storage media such as a magnetic disk, optical disk or semiconductor memory or via a communication network. Moreover, the music-piece-data display controlling apparatus of the present invention may be applied to a karaoke apparatus, electronic game apparatus, portable communication terminal such as a cellular phone, player piano, etc.

It should also be appreciated that the music piece data may be in any desired format, such as: the "event plus absolute time" format where the time of occurrence of each performance event is represented by an absolute time within the music piece or a measure thereof; the "event plus relative time" format where the time of occurrence of each performance event is represented by a time length from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event. Further, the music piece data may be in a format where data of a plurality of channels are mixed together, or in a format where data of a plurality of channels are separated from each other on a track-by-track basis. Furthermore, the music piece data may be processed by any suitable scheme, such as one where the processing period of the music piece data is varied in accordance with the currently-set performance tempo, one where the value of each timing data being automatically performed is varied in accordance with the currently-set performance tempo with the processing period kept constant, or one where the way of counting the timing data in the music piece data is varied per processing in accordance with the currently-set performance tempo with the processing period kept constant.

Moreover, time-serial music piece data may be stored in successive storage regions of a memory, or music piece data stored dispersedly in non-successive storage regions may be managed as successive data. Namely, it is only necessary that the music piece data be capable of being managed as time-serial data, and it does not manner whether or not the music piece data are actually stored in succession in a memory.

It should be obvious that the present invention may be used in combination with the conventionally-known technique of displaying lyrics while sequentially changing the display color. For example, one character at a current performance position and another character at a next performance position may be displayed in different display colors in accordance with the present invention so that these adjoining characters can be read clearly, and then the characters having been performed or sung are displayed in still another display color in accordance with progression of the melody as already known in the art.

Although the preferred embodiments and modifications have been described above as displaying a chord progression and performance timing of the keyboard part, the present invention may be arranged to display performance timing of any other desired performance part such as a percussion instrument part.

In summary, the present invention is characterized in that both characters of lyrics unit word and chord name at a current position and characters of lyrics unit word and chord name at a next position are displayed in different display styles (e.g., different colors). Thus, the present invention affords the benefit that the characters for the current position and the characters for the next position can be readily distinguished from each other even when they are displayed in overlapping condition. Further, in the case where characters of the lyrics and chord names are indicated along the time axis, the present invention is arranged to provide a plurality of screens of different display (time-axial) scales so that any one of the screens can be selected depending on the situation. With this arrangement, the present invention can provide a screen display of a wider range for a music piece where chord changes take place frequently, to thereby allow the user to ascertain any preceding chord. Further, for a music piece where chord changes do not take place so frequently, the present invention can provide a screen display of a narrower pitch range with increased intervals between the unit words.

Furthermore, in the case where chord names are displayed on the basis of chord name data, the present invention detects a note event, other than a chord name, of the keyboard part and displays performance timing of a chord. Thus, the present invention allows the user to know the performance timing of the keyboard part in the music piece, so that the user can even more enjoy the feeling of performing the music piece than by performing only to the displayed chord change timing.

What is claimed is:

1. A music piece data display method comprising the steps of:
   causing a display device to display a character string of lyrics for a predetermined performance section of a music piece in accordance with progression of a performance of the music piece; and
   controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles,
   wherein said step of causing causes the display device to display the character string of lyrics in a normal display style, and said step of controlling performs control such that the character or unit word of the lyrics corresponding to the current position is displayed in a unique first display style different from the normal display style and the character or unit word of the lyrics corresponding to the next position is displayed in a unique second display style different from both of the normal display style and said first display style.

2. A music piece data display method comprising the steps of:
   causing a display device to display a character string of lyrics for a predetermined performance section of a music piece in accordance with progression of a performance of the music piece; and
   controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles,
   wherein if the character string of lyrics are displayed on the display device with some adjoining characters or unit words of the lyrics overlapping each other at least partly, said step of controlling performs control such that the adjoining characters or unit words of the lyrics overlapping each other at least partly are displayed in different display styles so as to be visually distinguished from each other.

3. A music piece data display method comprising the steps of:

causing a display device to display accompaniment information for a predetermined performance section of a music piece in accordance with progression of a performance of the music piece; and controlling, in accordance with the progression of the performance, display of the accompaniment information on the display device in such a manner that a piece of the accompaniment information corresponding to a current position in the progression of the performance and a piece of the accompaniment information corresponding to a next position in the progression of the performance are displayed in different display styles, wherein said step of causing causes the display device to display the accompaniment information in a normal display style, and said step of controlling performs control such that the accompaniment information corresponding to the current position is displayed in a unique first display style different from the normal display style and the accompaniment information corresponding to the next position is displayed in a unique second display style different from both of the normal display style and said first display style.

4. A music piece data display method comprising the steps of:

causing a display device to display a character string of lyrics and accompaniment information for a predetermined performance section of a music piece in accordance with progression of a performance of the music piece;

controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and controlling, in accordance with the progression of the performance, display of the accompaniment information on the display device in such a manner that a piece of the accompaniment information corresponding to the current position in the progression of the performance and a piece of the accompaniment information corresponding to the next position in the progression of the performance are displayed in different display styles.

5. A music piece data display method comprising the steps of:

causing a display device to display a character string of lyrics for a predetermined performance section of a music piece in accordance with progression of a performance of the music piece;

controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and displaying accompaniment information near the character string of lyrics displayed on the display device, in accordance with the progression of the performance.

6. A music piece data display method comprising the steps of:

causing a display device to display a character string of lyrics for a predetermined performance section of a music piece in accordance with progression of a performance of the music piece; and displaying chord information in accordance with the progression of the performance and in corresponding relation to the character string of lyrics displayed on the display device, said step of displaying chord information determining respective positions of pieces of the chord information, to be displayed in succession, such that displays of the pieces of the chord information do not overlap each other, wherein intervals between characters or unit words in the character string of lyrics, to be displayed on the display device by said step of causing, can be varied to become non-uniform, depending on the positions of the pieces of the chord information displayed by said step of displaying chord information.

7. A music piece data display method comprising the steps of:

causing a display device to display a character string of lyrics for a predetermined performance section of a music piece in accordance with progression of a performance of the music piece;

displaying accompaniment information near the character string of lyrics displayed on the display device, in accordance with the progression of the performance; and displaying information indicative of performance timing of the accompaniment information, in corresponding relation to display of the accompaniment information by said step of displaying accompaniment information.

8. A music piece data display method as claimed in claim 7 which further comprises a step of detecting performance timing on the basis of performance data, and wherein respective performance timing of individual pieces of the accompaniment information, to be displayed by said step of displaying information indicative of performance timing, is set in accordance with the performance timing detected by said step of detecting.

9. A music piece data display method as claimed in claim 8 wherein said accompaniment information is in the form of chord information, and said step of detecting performance timing detects chord change timing.

10. A music piece data display method as claimed in claim 8 wherein said accompaniment information is in the form of chord information and said step of detecting performance timing detects performance timing of a predetermined performance part on the basis of performance data of the predetermined performance part other than chord data, and wherein the performance timing of the predetermined performance part detected by said step of detecting is displayed in corresponding relation to the accompaniment information.

11. A music piece data display method comprising the steps of:

displaying lyrics in accordance with progression of a performance of a music piece, and creating data of a display screen that displays, in corresponding relation to display of the lyrics, accompaniment information matching with the progression of the performance, wherein a plurality of the display screens can be created which differ from each other at least in time-axial display scale; and selecting one of the display screens and causing the display device to display the selected display screen.

12. A music piece data display method comprising the steps of:

displaying, by chord names, a chord progression for a predetermined performance section of a music piece in accordance with progression of a performance of the music piece; and simultaneously displaying component tones of a chord corresponding to a current position in the chord progression and component tones of a chord corresponding to a next position in the chord progression in different display styles visually distinguishing therebetween.

13. A music piece data display method as claimed in claim 12 wherein said step of displaying, by chord names, a chord progression displays a chord name corresponding to the current position in the chord progression, in a display style different from a display style of other of the chord names.

14. A music piece data display method comprising the steps of:

identifying an available pitch range of a keyboard to be used for a performance of a music piece; and displaying component tones of a chord to be currently performed in accordance with a chord progression of the performance, said step of displaying being capable of displaying chord component tones in a turn-back fashion such that any chord component tones can be displayed within the available pitch range of the keyboard identified by said step of identifying.

15. A music piece data display method comprising the steps of:

causing a display device to display lyrics for a predetermined performance section of a music piece and chord names corresponding to a chord progression in the predetermined performance section, in accordance with progression of the performance; and making a display indicating, on a diagram simulating a keyboard, component tones of at least a chord corresponding to a current position in the chord progression.

16. A music-piece-data display controlling apparatus comprising:

a display device; and a processor coupled with said display device and adapted to:

cause said display device to display a character string of lyrics for a predetermined performance section of a music piece in accordance with progression of a performance of the music piece; and control, in accordance with the progression of the performance, display of the character string of lyrics on said display device in such a manner that a character or unit word of the lyrics corresponding to a current position in the progression of the performance and a character or unit word of the lyrics corresponding to a next position in the progression of the performance are displayed in different display styles, wherein said processor causes the display device to display the character string of lyrics in a normal display style, and performs control such that the character or unit word of the lyrics corresponding to the current position is displayed in a unique first display style different from the normal display style and the character or unit word of the lyrics corresponding to the next position is displayed in a unique second display style different from both of the normal display style and said first display style.

17. A music-piece-data display controlling apparatus comprising:

a display device; and a processor coupled with said display device and adapted to:

cause said display device to display accompaniment information for a predetermined performance section of a music piece, in accordance with progression of a performance of the music piece; and control, in accordance with the progression of the performance, display of the accompaniment information on said display device in such a manner that a piece of the accompaniment information corresponding to a current position in the progression of the performance and a piece of the accompaniment information corresponding to a next position in the progression of the performance are displayed in different display styles, wherein said processor causes the display device to display the accompaniment information in a normal display style, and performs control such that the accompaniment information corresponding to the current position is displayed in a unique first display style different from the normal display style and the accompaniment information corresponding to the next position is displayed in a unique second display style different from both of the normal display style and said first display style.

18. A music-piece-data display controlling apparatus comprising:

a display device; and a processor coupled with said display device and adapted to:

cause said display device to display a character string of lyrics and accompaniment information for a predetermined performance section of a music piece in accordance with progression of a performance of the music piece;

control, in accordance with the progression of the performance, display of the character string of lyrics on said display device in such a manner that a character or unit word of the lyrics corresponding to a current position in the progression of the performance and a character or unit word of the lyrics corresponding to a next position in the progression of the performance are displayed in different display styles; and control, in accordance with the progression of the performance, display of the accompaniment information on said display device in such a manner that a piece of the accompaniment information corresponding to the current position in the progression of the performance and a piece of the accompaniment information corresponding to the next position in the progression of the performance are displayed in different display styles.

19. A music-piece-data display controlling apparatus comprising:
   a display device; and
   a processor coupled with said display device and adapted to:
      cause said display device to display a character string of lyrics for a predetermined performance section of a music piece, in accordance with progression of a performance of the music piece;
      control, in accordance with the progression of the performance, display of the character string of lyrics on said display device in such a manner that a character or unit word of the lyrics corresponding to a current position in the progression of the performance and a character or unit word of the lyrics corresponding to a next position in the progression of the performance are displayed in different display styles; and
      display accompaniment information near the character string of lyrics displayed on said display device, in accordance with the progression of the performance.

20. A music-piece-data display controlling apparatus comprising:
   a display device; and
   a processor coupled with said display device and adapted to:
      cause said display device to display a character string of lyrics for a predetermined performance section of a music piece in accordance with progression of a performance of the music piece; and
      display chord information in accordance with the progression of the performance and in corresponding relation to the character string of lyrics displayed on said display device, wherein respective positions of pieces of the chord information, to be displayed in succession, are determined such that displays of the pieces of the chord information do not overlap each other,
      wherein intervals between characters or unit words in the character string of lyrics, to be displayed on said display device, can be varied to become non-uniform, depending on the positions of the pieces of the chord information to be displayed on said display device.

21. A music-piece-data display controlling apparatus comprising:
   a display device; and
   a processor coupled with said display device and adapted to:
      cause said display device to display a character string of lyrics for a predetermined performance section of a music piece in accordance with progression of a performance of the music piece;
      display accompaniment information near the character string of lyrics displayed on said display device, in accordance with the progression of the performance; and
      display information indicative of performance timing of the accompaniment information, in corresponding relation to display of the accompaniment information on said display device.

22. A music-piece-data display controlling apparatus comprising:
   a display device; and
   a processor coupled with said display device and adapted to:
      display lyrics in accordance with progression of a performance of a music piece, and create data of a display screen that displays, in corresponding relation to display of the lyrics, accompaniment information matching with the progression of the performance, wherein a plurality of the display screens can be created which differ from each other at least in time-axial display scale; and
      select one of the display screens and cause said display device to display the selected display screen.

23. A music-piece-data display controlling apparatus comprising:
   a display device; and
   a processor coupled with said display device and adapted to:
      cause said display device to display, by chord names, a chord progression for a predetermined performance section of a music piece in accordance with progression of a performance of the music piece; and
      cause said display device to simultaneously display component tones of a chord corresponding to a current position in the chord progression and component tones of a chord corresponding to a next position in the chord progression in different display styles visually distinguishing therebetween.

24. A music-piece-data display controlling apparatus comprising:
   a display device; and
   a processor coupled with said display device and adapted to:
      identify an available pitch range of a keyboard to be used for a performance of a music piece; and
      cause said display device to display component tones of a chord to be currently performed in accordance with a chord progression of the performance, wherein said processor allows chord component tones to be displayed in a turn-back fashion such that any chord component tones are displayed within the identified available pitch range of the keyboard.

25. A music-piece-data display controlling apparatus comprising:
   a display device; and
   a processor coupled with said display device and adapted to:
      cause said display device to display lyrics for a predetermined performance section and chord names corresponding to a chord progression in the predetermined performance section, in accordance with progression of the performance; and
      make a display indicating, on a diagram simulating a keyboard, component tones of at least a chord corresponding to a current position in the chord progression.

26. A machine-readable storage medium containing a group of instructions to cause said machine to implement a music piece data display method, said music piece data display method comprising the steps of:
   causing a display device to display a character string of lyrics for a predetermined performance section of a music piece, in accordance with progression of a performance of the music piece; and
   controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles, wherein said step of causing causes the display device to display the character string of lyrics in a normal display style, and said step of controlling performs control such that the character or unit word of the lyrics corresponding to the current position is displayed in a unique first display style different from the normal display style and the character or unit word of the lyrics corresponding to the next position is displayed in a unique second display style different from both of the normal display style and said first display style.

27. A machine-readable storage medium containing a group of instructions to cause said machine to implement a music piece data display method, said music piece data display method comprising the steps of:

causing a display device to display accompaniment information for a predetermined performance section of a music piece, in accordance with progression of a performance of the music piece; and controlling, in accordance with the progression of the performance, display of the accompaniment information on the display device in such a manner that a piece of the accompaniment information corresponding to a current position in the progression of the performance and a piece of the accompaniment information corresponding to a next position in the progression of the performance are displayed in different display styles, wherein said step of causing causes the display device to display the accompaniment information in a normal display style, and said step of controlling performs control such that the accompaniment information corresponding to the current position is displayed in a unique first display style different from the normal display style and the accompaniment information corresponding to the next position is displayed in a unique second display style different from both of the normal display style and said first display style.

28. A machine-readable storage medium containing a group of instructions to cause said machine to implement a music piece data display method, said music piece data display method comprising the steps of:

causing a display device to display a character string of lyrics and accompaniment information for a predetermined performance section of a music piece, in accordance with progression of a performance of the music piece;

controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and controlling, in accordance with the progression of the performance, display of the accompaniment information on the display device in such a manner that a piece of the accompaniment information corresponding to the current position in the progression of the performance and a piece of the accompaniment information corresponding to the next position in the progression of the performance are displayed in different display styles.

29. A machine-readable storage medium containing a group of instructions to cause said machine to implement a music piece data display method, said music piece data display method comprising the steps of:

causing a display device to display a character string of lyrics for a predetermined performance section of a music piece in accordance with progression of a performance of the music piece; and controlling, in accordance with the progression of the performance, display of the character string of lyrics on the display device in such a manner that a character or unit word of the lyrics corresponding to a current position in the progression of the performance and a character or unit word of the lyrics corresponding to a next position in the progression of the performance are displayed in different display styles; and displaying accompaniment information near the character string of lyrics displayed on the display device, in accordance with the progression of the performance.

30. A machine-readable storage medium containing a group of instructions to cause said machine to implement a music piece data display method, said music piece data display method comprising the steps of:

causing a display device to display a character string of lyrics for a predetermined performance section of a music piece, in accordance with progression of a performance of the music piece; and displaying chord information in accordance with the progression of the performance and in corresponding relation to the character string of lyrics displayed on the display device, said step of displaying chord information determining respective positions of pieces of the chord information, to be displayed in succession, such that displays of the pieces of the chord information do not overlap each other, wherein intervals between characters or unit words in the character string of lyrics, to be displayed on the display device by said step of causing, can be varied to become non-uniform, depending on the positions of the pieces of the chord information displayed by said step of displaying chord information.

31. A machine-readable storage medium containing a group of instructions to cause said machine to implement a music piece data display method, said music piece data display method comprising the steps of:

causing a display device to display a character string of lyrics for a predetermined performance section of a music piece, in accordance with progression of a performance of the music piece;

displaying accompaniment information near the character string of lyrics displayed on the display device, in accordance with the progression of the performance; and displaying information indicative of performance timing of the accompaniment information, in corresponding relation to display of the accompaniment information by said step of displaying accompaniment information.

32. A machine-readable storage medium containing a group of instructions to cause said machine to implement a music piece data display method, said music piece data display method comprising the steps of:

displaying lyrics in accordance with progression of a performance of a music piece, and creating data of a display screen that displays, in corresponding relation to display of the lyrics, accompaniment information matching with the progression of the performance, wherein a plurality of the display screens can be created which differ from each other at least in time-axial display scale; and selecting one of the display screens and causing the display device to display the selected display screen.

33. A machine-readable storage medium containing a group of instructions to cause said machine to implement a music piece data display method, said music piece data display method comprising the steps of:

displaying, by chord names, a chord progression for a predetermined performance section of a music piece in accordance with progression of a performance of the music piece; and simultaneously displaying component tones of a chord corresponding to a current position in the chord progression and component tones of a chord corresponding to a next position in the chord progression in different display styles visually distinguishing therebetween.

34. A machine-readable storage medium containing a group of instructions to cause said machine to implement a music piece data display method, said music piece data display method comprising the steps of:

identifying an available pitch range of a keyboard to be used for a performance of a music piece; and displaying component tones of a chord to be currently performed in accordance with a chord progression of the performance, said step of displaying being capable of displaying chord component tones in a turn-back fashion such that any chord component tones can be displayed within the available pitch range of the keyboard identified by said step of identifying.

35. A machine-readable storage medium containing a group of instructions to cause said machine to implement a music piece data display method, said music piece data display method comprising the steps of:

causing a display device to display lyrics for a predetermined performance section and chord names corresponding to a chord progression in the predetermined performance section in accordance with progression of the performance; and making a display indicating, on a diagram simulating a keyboard, component tones of at least a chord corresponding to a current position in the chord progression.

* * * * *